(12) United States Patent
Hu et al.

(10) Patent No.: US 10,659,690 B2
(45) Date of Patent: May 19, 2020

(54) SYSTEMS AND METHODS FOR MOBILE PLATFORM IMAGING

(71) Applicant: SZ DJI TECHNOLOGY CO., LTD., Shenzhen (CN)

(72) Inventors: Pan Hu, Shenzhen (CN); Linchao Bao, Shenzhen (CN); Zisheng Cao, Shenzhen (CN); Chenglin Mao, Shenzhen (CN); Zihan Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 13 days.

(21) Appl. No.: 16/033,602

(22) Filed: Jul. 12, 2018

(65) Prior Publication Data

US 2018/0359419 A1 Dec. 13, 2018

Related U.S. Application Data

(63) Continuation of application No. PCT/CN2016/093769, filed on Aug. 6, 2016.

(51) Int. Cl.
| | |
|---|---|
| H04N 5/232 | (2006.01) |
| H04N 5/247 | (2006.01) |
| G06T 3/40 | (2006.01) |
| B64C 39/02 | (2006.01) |
| G03B 15/00 | (2006.01) |

(52) U.S. Cl.
CPC ....... *H04N 5/23258* (2013.01); *B64C 39/024* (2013.01); *G03B 15/006* (2013.01); *G06T 3/4038* (2013.01); *H04N 5/2328* (2013.01); *H04N 5/2329* (2013.01); *H04N 5/23238* (2013.01); *H04N 5/23267* (2013.01); *H04N 5/247* (2013.01); *B64C 2201/123* (2013.01); *B64C 2201/127* (2013.01)

(58) Field of Classification Search
CPC ............. H04N 5/23258; H04N 5/2328; H04N 5/2329; H04N 5/247; G03B 15/006; G06T 3/4038
See application file for complete search history.

(56) References Cited

U.S. PATENT DOCUMENTS

| | | | |
|---|---|---|---|
| 2008/0136923 A1* | 6/2008 | Inbar | G02B 27/646 |
| | | | 348/208.2 |
| 2011/0164108 A1 | 7/2011 | Bates et al. | |

(Continued)

FOREIGN PATENT DOCUMENTS

| | | |
|---|---|---|
| CN | 105120146 A | 12/2015 |
| CN | 105657432 A | 6/2016 |

(Continued)

OTHER PUBLICATIONS

The World Intellectual Property Organization (WIPO) International Search Report and Written Opinion for PCT/CN2016/093769 May 2, 2017 9 Pages.

*Primary Examiner* — Ahmed A Berhan
(74) *Attorney, Agent, or Firm* — Anova Law Group, PLLC

(57) ABSTRACT

A method of image stabilization includes obtaining movement data for an imaging device mounted to a mobile platform, adjusting an input image acquired by the imaging device according to the movement data to obtain a stabilized image, and displaying the stabilized image according to a selected viewport.

17 Claims, 30 Drawing Sheets

(56) References Cited

U.S. PATENT DOCUMENTS

| | | | |
|---|---|---|---|
| 2012/0019660 A1* | 1/2012 | Golan | H04N 5/232 |
| | | | 348/144 |
| 2014/0078327 A1 | 3/2014 | Miyasako | |
| 2016/0057352 A1* | 2/2016 | Yoneda | H04N 5/23251 |
| | | | 348/208.4 |

FOREIGN PATENT DOCUMENTS

| | | |
|---|---|---|
| WO | 2010072996 A1 | 7/2010 |
| WO | 2010116366 A1 | 10/2010 |
| WO | 2014042894 A1 | 3/2014 |

\* cited by examiner

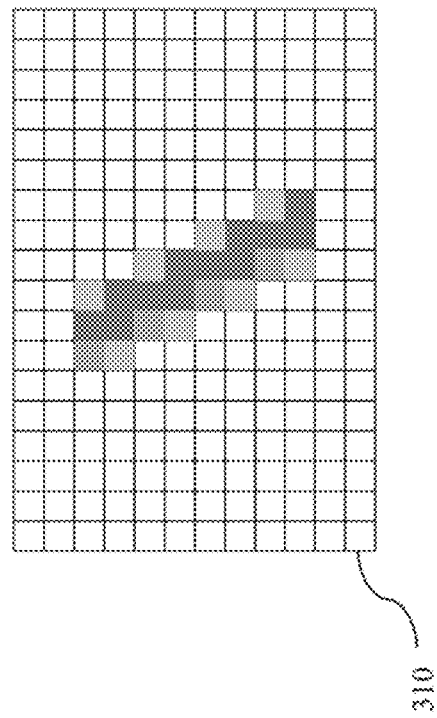
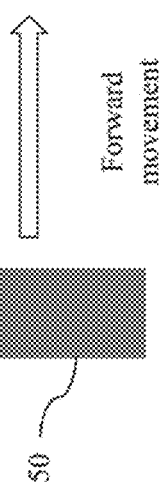
Fig. 8

Fig. 20  Pitch angle φ=30°

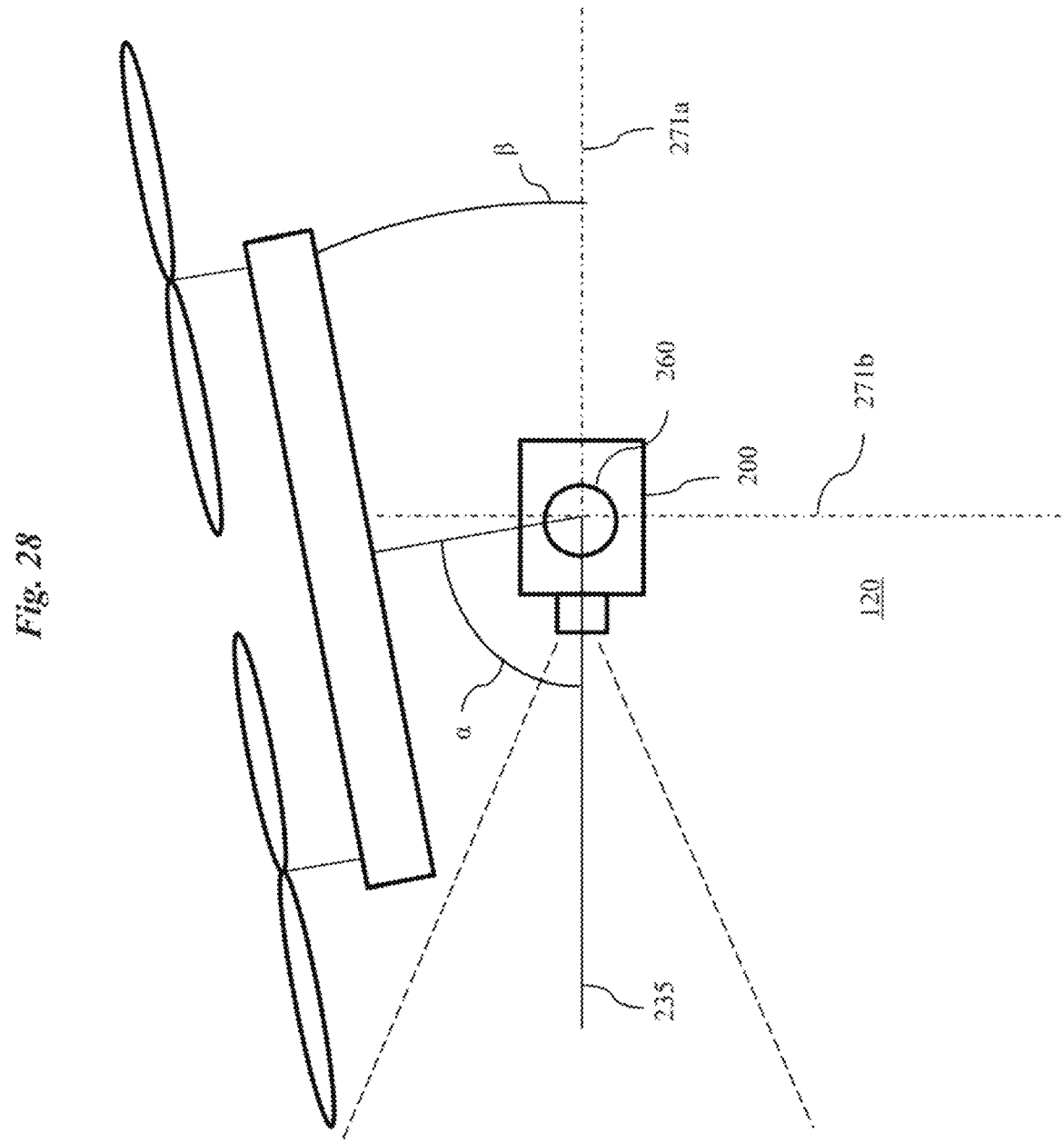

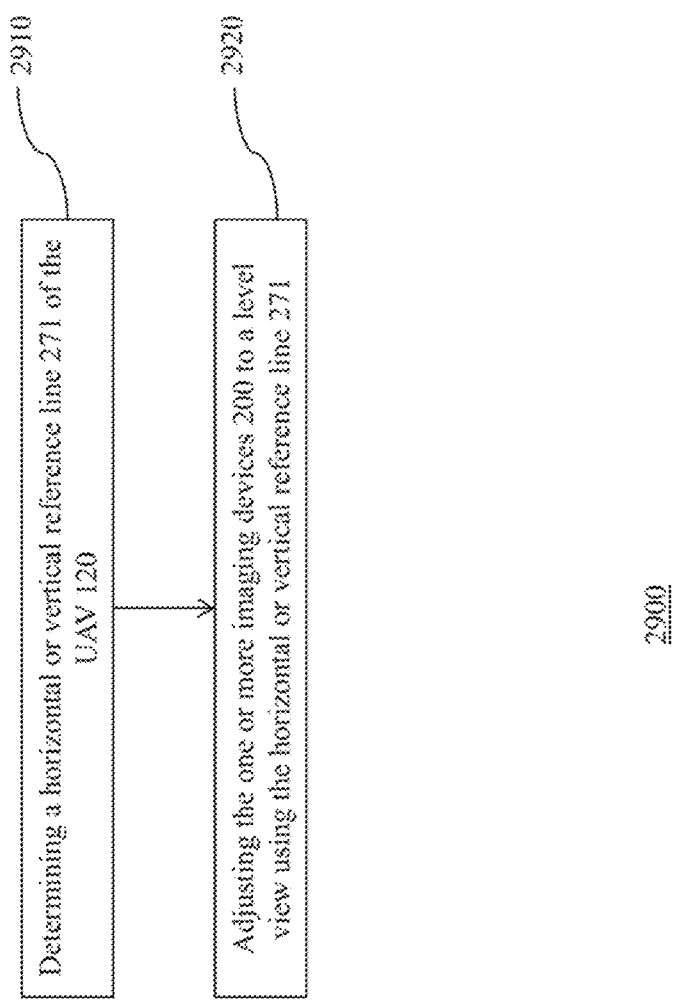

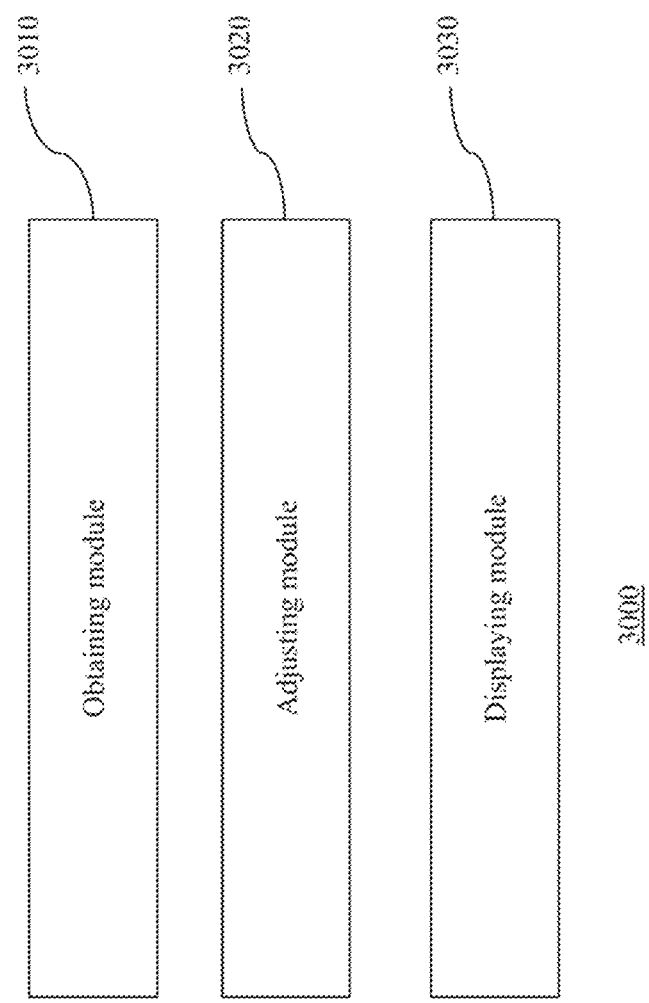

SYSTEMS AND METHODS FOR MOBILE PLATFORM IMAGING

CROSS-REFERENCE TO RELATED APPLICATION

This application is a continuation of International Application No. PCT/CN2016/093769, filed on Aug. 6, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging and more particularly, but not exclusively, to systems and methods for imaging aboard a mobile platform.

BACKGROUND

Mobile platforms, such as unmanned aircraft, can be used in many different fields such as film production, sporting events, disaster relief, geological study, and more. Imaging aboard a mobile platform presents difficulties due to instability of onboard imaging devices, creating undesirable blurring and jitter. Hence, image stabilization is an important function for imaging aboard mobile platforms. Existing image stabilization techniques have numerous drawbacks for imaging aboard a mobile platform. For example, mechanical image stabilization can require complex and clumsy apparatus that are unsuitable for light-weight mobile platforms. Furthermore, there currently lacks suitable image stabilization systems and methods suitable for multi-camera applications such as panoramic imaging.

In view of the foregoing, there is a need for improved systems and methods for stabilizing imaging aboard a mobile platform, particularly for multi-camera applications such as panoramic imaging.

SUMMARY

In accordance with a first aspect disclosed herein, there is set forth a method of image stabilization, comprising: obtaining movement data for one or more imaging devices mounted to a mobile platform; adjusting input images acquired by the imaging devices according to the movement data to obtain stabilized images; and displaying the stabilized images according to a selected viewport.

In accordance with another aspect disclosed herein, there is set forth a mobile platform comprising: one or more imaging devices mounted to the mobile platform; one or more processors configured for: adjusting input images acquired by the imaging devices according to movement data of the imaging devices to obtain stabilized images; and controlling displaying the stabilized images according to a selected viewport.

In accordance with another aspect disclosed herein, there is set forth an apparatus for image stabilization on a mobile platform, comprising: one or more imaging devices mounted to the mobile platform; one or more processors configured for: adjusting input images acquired by the imaging devices according to movement data of the imaging devices to obtain stabilized images; and controlling displaying the stabilized images according to a selected viewport.

In accordance with another aspect disclosed herein, there is set forth a non-transitory computer-readable medium with instructions stored thereon that, when executed by a processor, perform the steps comprising: obtaining movement data for one or more imaging devices mounted to a mobile platform; adjusting input images acquired by the imaging devices according to the movement data to obtain stabilized images; and displaying the stabilized images according to a selected viewport.

In accordance with another aspect disclosed herein, there is set forth a processing system, comprising: an obtaining module for obtaining movement data for one or more imaging devices mounted to a mobile platform; an adjusting module for adjusting input images acquired by the imaging devices according to the movement data to obtain stabilized images; and a displaying module for displaying the stabilized images according to a selected viewport.

BRIEF DESCRIPTION OF THE DRAWINGS

FIG. 8 is an exemplary diagram illustrating an embodiment of a rolling shutter image correction using the system of FIG. 1.

FIG. 28 is an exemplary diagram illustrating an embodiment of a method for leveling a viewing angle of an imaging device in accordance with the method of FIG. 6.

FIG. 29 is an exemplary flow chart illustrating another embodiment of a method for leveling a viewing angle of an imaging device in accordance with the method of FIG. 6.

FIG. 30 is an exemplary diagram illustrating an embodiment of a processing system in accordance with the present systems and methods.

Figure 1:
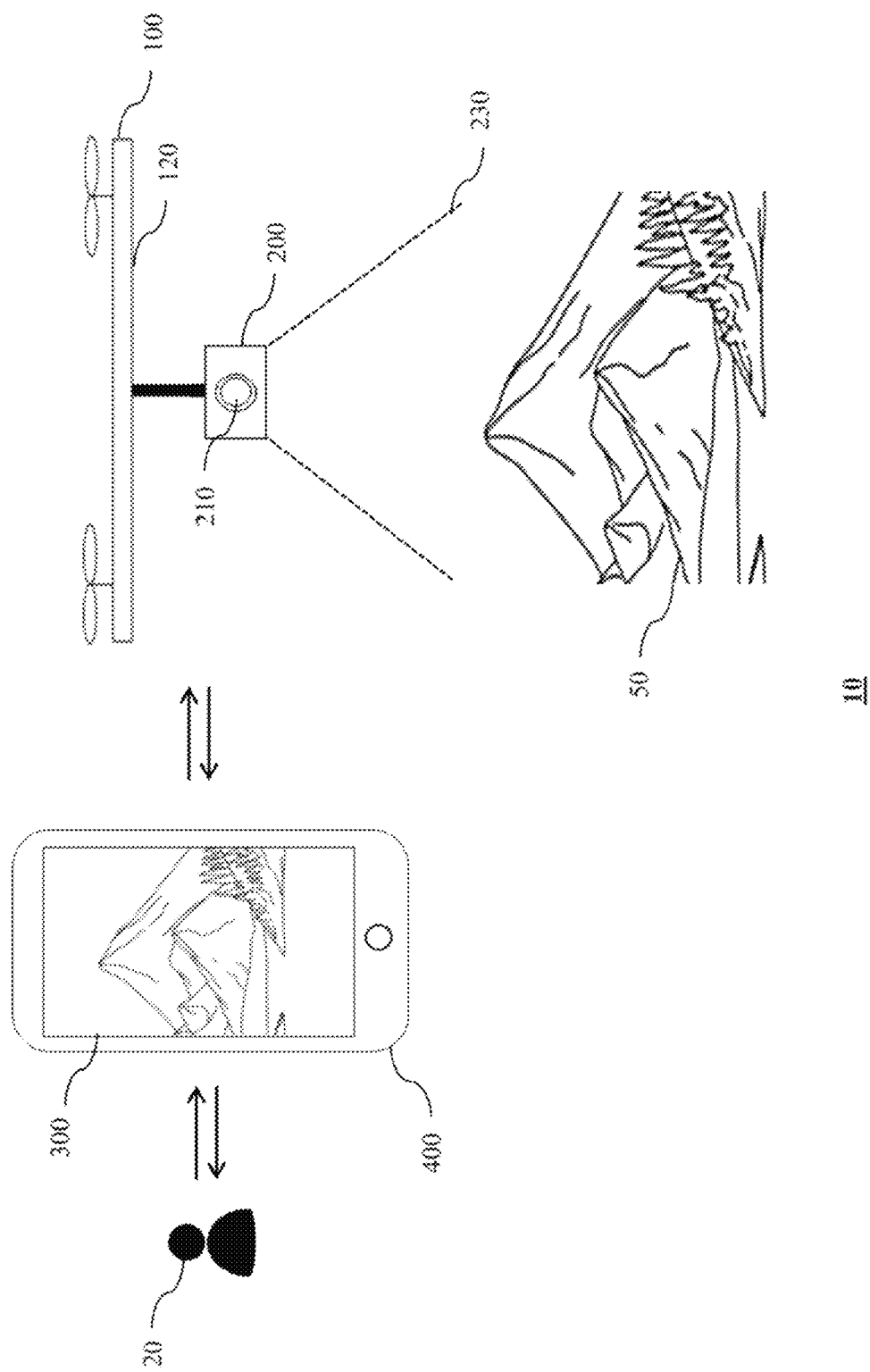
FIG. 1 is an exemplary top level diagram illustrating an embodiment of a system for image stabilization.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

The present disclosure sets forth systems and methods for image stabilization aboard mobile platforms, which overcome limitations of prior systems and methods. In particular, the present systems and methods can be used for panoramic imaging using multiple imaging devices. For example, the present systems and methods allow for image stabilization in assembly of multiple video frames into a panoramic video. Exemplary embodiments of the present systems and methods are described below.

Turning now to FIG. 1, an exemplary mobile platform imaging system 10 is shown as including a mobile platform 100 and an imaging device 200. The imaging device 200 is shown as having a field-of-view ("FOV") 230 for imaging a scene 50 of interest. The scene 50 is captured as an image 300 (for example, a still image or video frame) that can be displayed to a user 20 on a user terminal 400. A mobile platform imaging system 10 can include one or more of the mobile platform 100, imaging device 200, and/or user terminal 400, without limitation.

A mobile platform 100 in the present systems and methods can include any type of mobile platform, including bicycles, automobiles, trucks, ships, boats, trains, helicopters, aircraft, robotic devices, various hybrids thereof, and the like. Although the mobile platform 100 is shown in some examples herein as being a flying mobile platforms for illustrative purposes only, such examples are not meant to be limiting. The embodiments described herein in the context of flying mobile platforms can be applied to any suitable mobile platform 100.

The mobile platform 100 can include or more functional modules for carrying out, for example, movement, communication, imaging, and/or other functionality. For example, functional modules of the mobile platform can include one or more movement mechanisms (for example, propulsion mechanisms), sensing systems, and communication system. The mobile platform 100 can further include hardware components such as processors, memories, etc., as desired.

In some embodiments, the mobile platform 100 can be an unmanned aerial vehicle (UAV) 120. Colloquially referred to as "drones," UAVs 120 include aircraft without a human pilot onboard the vehicle whose flight is controlled autonomously or by a remote pilot (or sometimes both). UAVs 120 are now finding increased usage in civilian applications involving various aerial operations, such as data-gathering or delivery. The present imaging systems and methods are suitable for use with many types of UAVs 120 including, without limitation, quadcopters (also referred to as quadrotor helicopters or quad rotors), single rotor, dual rotor, trirotor, hexarotor, and octorotor rotorcraft UAVs 120, fixed wing UAVs 120, and hybrid rotorcraft-fixed wing UAVs 120.

The imaging device 200 can receive incident light from an external environment and can convert the incident light into digital and/or analog signals. The signals can be processed to produce an image 300 that can be displayed to the user 20. Exemplary imaging devices 200 suitable for use with the present systems and methods, include, but are not limited to, commercially-available cameras and camcorders. Although a single imaging device 200 is shown in FIG. 1 for illustrative purposes only, any number of imaging devices 200 can be used, as desired. For example, the present systems and methods can use 2, 3, 4, 5, 6, or even a greater number of imaging devices 200, as desired. In some embodiments, multiple imaging devices 200 can be used to acquire panoramic images 350 (shown in FIG. 7) for panoramic imaging or video applications. In some embodiments, one or more omnidirectional imaging devices 200 (for example, omnidirectional cameras) can be used for the present systems and methods.

The imaging device 200 can receive the incident light through an aperture (not shown) and focus the light using a lens (not shown). Exemplary lenses that are suitable for the imaging device 200 include, without limitation, a single-lens reflex (DSLR) lens, a pin-hole lens, a biological lens, a simple convex glass lens, a macro lens, a zoom lens, a telephoto lens, a fisheye lens, a rectilinear lens, a wide-angle lens, and the like. The imaging device 200 can also include apparatus (not shown) that separates and/or filters the sensed light based on color.

The incident light can be focused using the lens on an image sensor 210 of the imaging device 200. The image sensor 210 can sense the incident light and convert the sensed light into analog and/or digital signals that can be rendered as the image 300. Suitable image sensors 210 can include analog sensors (for example, video camera tubes) and/or digital sensors (for example, charge-coupled device (CCD), complementary metal-oxide-semiconductor (CMOS), N-type metal-oxide-semiconductor (NMOS) imaging devices and hybrids/variants thereof).

In some embodiments, the imaging device 200 can include image sensors 210 having an array of photosensor elements, each of which can capture a pixel of image information. Increasing the number of photosensor elements increases the resolution of the imaging device 200 in corresponding fashion. In some embodiments, the imaging device 200 has a resolution of at least 0.1 Megapixels, 0.5 Megapixels, 1 Megapixel, 2 Megapixels, 5 Megapixels, 10 Megapixels, 20 Megapixels, 50 Megapixels, 100 Megapixels, or an even greater number of pixels.

In some embodiments, the image sensor 210 can be a global shutter image sensor that can expose all pixels of the image at the same time. In other embodiments, the image sensor can be a rolling shutter image sensor 210 that can capture a portion of the pixels of the image at any given time. For example, a rolling shutter image sensor can expose one or more lines (for example, rows or columns) of pixels at each instant of exposure. The lines of pixels obtained via a plurality of exposures can form a full image 300.

In some embodiments, the imaging device 200 can have one or more image sensors 210 for use in various applications such as thermography, creation of multi-spectral images, infrared detection, gamma detection, x-ray detection, and the like. The imaging device 200 can include, for example, image sensors 250 that are electro-optical sensors, thermal/infrared sensors, color or monochrome sensors, multi-spectral imaging sensors, spectrophotometers, spectrometers, thermometers, and/or illuminometers, as desired.

The user terminal 400 can be configured to interact with the user 20 to operate the mobile platform 100 and/or present images 300 collected by the mobile platform 100 to the user 20. The user terminal 400 can include, for example, one or more remote controllers (not shown), portable computers, laptops, mobile devices, handheld devices, mobile telephones (for example, smartphones), tablet devices, tablet computers, personal digital assistants, handheld consoles, portable media players, wearable devices (for example, smartwatches and head-mounted displays), and the like. While the user terminal 400 is shown in FIG. 1 as a smartphone for illustrative purposes only, the user terminal 400 is not limited as such.

The user terminal 400 can include one or more input/output devices (not shown), such as buttons, a keyboard, keypad, trackball, displays, and/or a monitor. Various user interface elements (for example, windows, buttons, menus, icons, pop-ups, tabs, controls, cursors, insertion points, and the like) can be used to present data to and receive data from a user (not shown).

Various technologies can be used for remote communication between the mobile platform 100 and the user terminal 400. Suitable communication technologies include, for example, radio, Wireless Fidelity (Wi-Fi), cellular, satellite, and broadcasting. Exemplary wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT), and others.

In some embodiments, the communications between the mobile platform 100 and the user terminal 400 can advantageously be encrypted to prevent third party intrusion. Suitable encryption methods include, but are not limited to, internet key exchange, Internet Protocol Security (IPsec), Kerberos, point-to-point protocol, transport layer security, SSID hiding, MAC ID filtering, Static IP addressing, 802.11 security, Wired Equivalent Privacy (WEP), Wi-Fi Protected Access (WPA), WPA2, Temporal Key Integrity Protocol (TKIP), Extensible Authentication Protocol (EAP), Lightweight Extensible Authentication Protocol (LEAP), Protected Extensible Authentication Protocol (PEAP), and the like.

Figure 2:
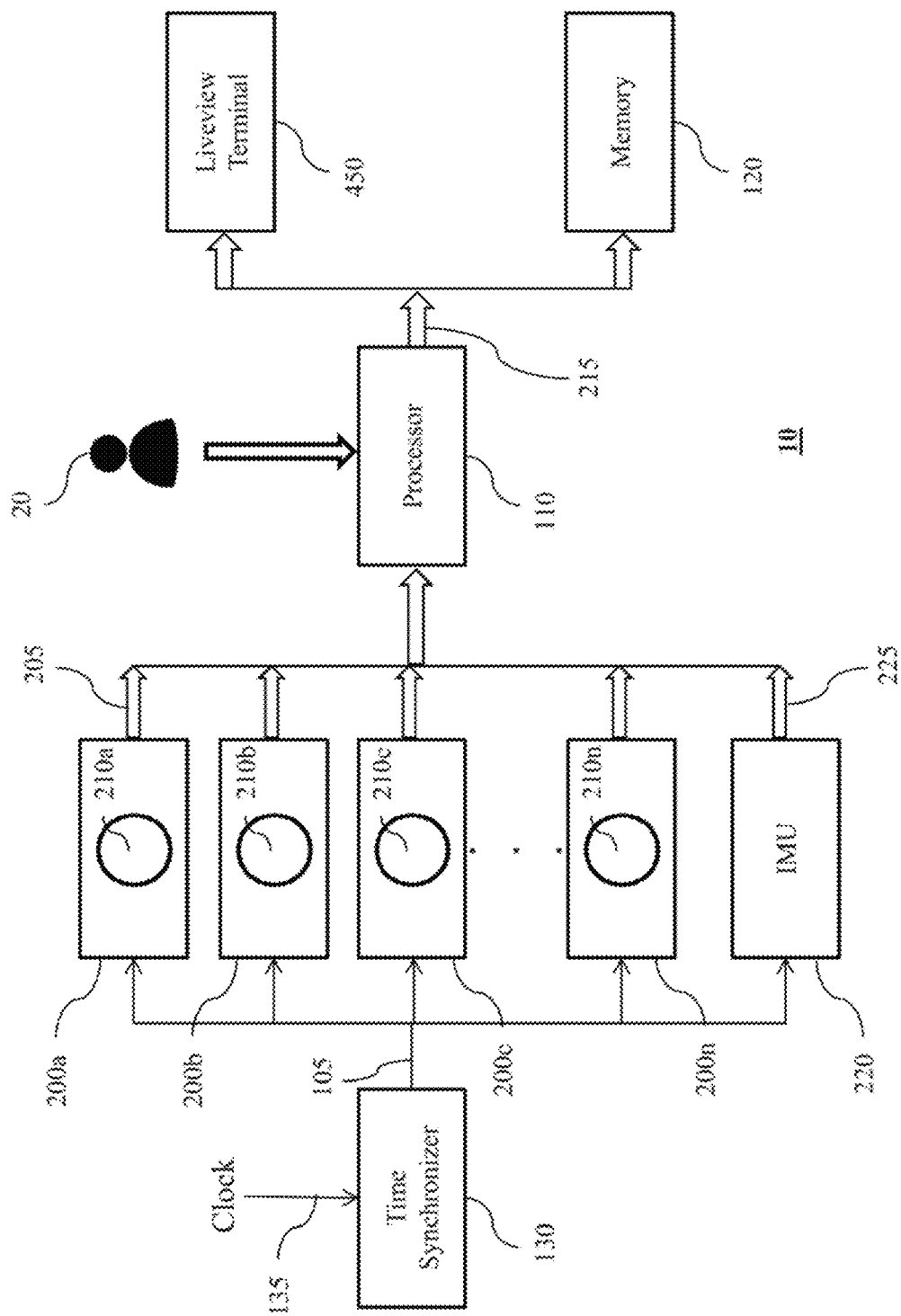
FIG. 2 is an exemplary diagram illustrating an embodiment of the system of FIG. 1.

Turning now to FIG. 2, an exemplary mobile platform imaging system 10 is shown as including a plurality of imaging devices 200a-n. The imaging devices 200a-n include respective image sensors 210a-n for acquiring images 300 (shown in FIG. 1). As shown in FIG. 2, the imaging devices 200a-n can be synchronized using a time synchronizer 130. In some embodiments, the time synchronizer 130 can be operated with reference to a clock signal 135 that regulates the timing of the synchronization signals 105.

The time synchronizer 130 can, for example, transmit a synchronization signal 105 to each of the imaging devices 200a-n, so that the imaging devices 200a-n can capture respective images 300 at the same time. In some embodiments, the image data 205 captured by the imaging devices 220a-n can be designed by a timestamp (not shown) indicative of the time of image acquisition. The images 300 captured imaging devices 200a-n can be processed and assembled into a larger image representing multiple fields-of-view, such as a panoramic image 350. The timestamp associated with the image data 205 can be used for identification of image data 205 from different images devices 200a-n that are taken at the same or similar times.

As shown in FIG. 2, image data 205 captured by the imaging devices 200a-n can be transmitted to a processor 110 for processing. The processing can be performed based on input from the user 20. Although a single processor is shown in FIG. 2 for illustrative purposes only, any number of processors can be used in the present systems and methods. Without limitation, each processor 110 can include one or more general purpose microprocessors (for example, single or multi-core processors), application-specific integrated circuits (ASIC), field-programmable gate arrays (FPGA), application-specific instruction-set processors, digital signal processing units, coprocessors, network processing units, audio processing units, encryption processing units, and the like. The processors 110 can be configured to perform any of the methods described herein, including but not limited to a variety of tasks relating to image processing. In some embodiments, the processors 110 can include specialized software and/or hardware, such as a graphics processing unit (GPU) for image processing and/or a digital signal processor (DSP) for signal processing. In some embodiments, the processors 110 can execute an analyzer that operates to perform any of the methods described herein.

Processed data 215 can be transmitted from the processor 110 to one or more memories 120 (alternatively referred to herein as non-transient computer readable media). For example, frames of a panoramic video that are assembled by the processor can be successively transmitted to the memory 120 to constitute a video file. Suitable memories 120 can include, for example, random access memory (RAM), static RAM, dynamic RAM, read-only memory (ROM), programmable ROM, erasable programmable ROM, electrically erasable programmable ROM, flash memory, secure digital (SD) card, and the like. Instructions for performing any of the methods described herein can be stored in the memory 120. The memory 120 can be placed in operative communication with the processors 110, as desired, and instructions and/or data can be transmitted from the memory 120 to the processors 110 for execution, as desired.

The components of the mobile platform imaging system 10, such as the processors 110 and the memory 120, can be located anywhere as desired. In some embodiments, the processors 110 and the memory 120, can be situated on the mobile platform 100 (shown in FIG. 1) (for example, disposed within a fuselage of the mobile platform 100 to avoid wear and tear). In some embodiments, the processors 110 and the memory 120, can be situated on an apparatus mounted on the mobile platform 100 (shown in FIG. 1). For example, the processors 110 and the memory 120, can be situated on an apparatus (not shown) proximally situated with respect to the imaging devices 200 for ease of communication. In some embodiments, the processors 110 and the memory 120 can be situated in a user terminal 400 (shown in FIG. 1), and can be configured to remotely communicate with the imaging devices 200.

In some embodiments, the processed data 215 can be transmitted from the processor 110 to a liveview terminal 450. The liveview terminal 450 can be used to display images and/or video captured by the imaging devices 220 to the user 20 in real time. In some embodiments, the user can select a region of interest that constitutes a viewport 370 (shown in FIG. 7), and images can be displayed according to the selected viewport 370. In some embodiments, the liveview terminal 450 can be situated on the user terminal 400. For example, the liveview terminal 450 can be displayed within an application for mobile platform imaging and control that is installed on the user terminal 400.

The mobile platform imaging system 10 can include one or more apparatus for detecting a position of the imaging devices 200 to facilitate image stabilization. As further illustrated in FIG. 2, the exemplary system shown includes an inertial measurement unit (IMU) 220 for sensing the position of one or more components of the mobile platform imaging system 10. The IMU 220 can include one or more sensors, such as gyroscopes, accelerometers, magnetometers, and the like, for measuring force, linear and angular velocity and acceleration. The IMU 220 can be used, for example, for measuring a current pitch, yaw, and/or roll of an aerial mobile platform 100. By integrating the sensed acceleration over time, a current velocity and/or position of the IMU 220 and any associated components can be ascertained. In some embodiments, position measurements obtained by the IMU 220 can be supplemented and/or verified using a global positioning system (GPS). Although a single IMU is shown in FIG. 2 for illustrative purposes only, any number of IMUs 220 can be used, as desired. In some embodiments, each of the imaging devices 200a-n can be associated with a respective IMU 220a-n.

As shown in FIG. 2, the one or more IMUs 220 can be synchronized with respect to the imaging devices 200a-n via the synchronization signal 105 sent from the time synchronizer 130. The IMU 220 can obtain movement data 225 indicative of a position, velocity, and/or acceleration of a component associated with the IMU 220. The movement data 225 can be marked with a timestamp (not shown) indicating the time at which the movement data 225 was acquired. The movement data 225 can subsequently be transmitted to the processor 110 along with the image data 205 to facilitate image processing.

Figure 3:
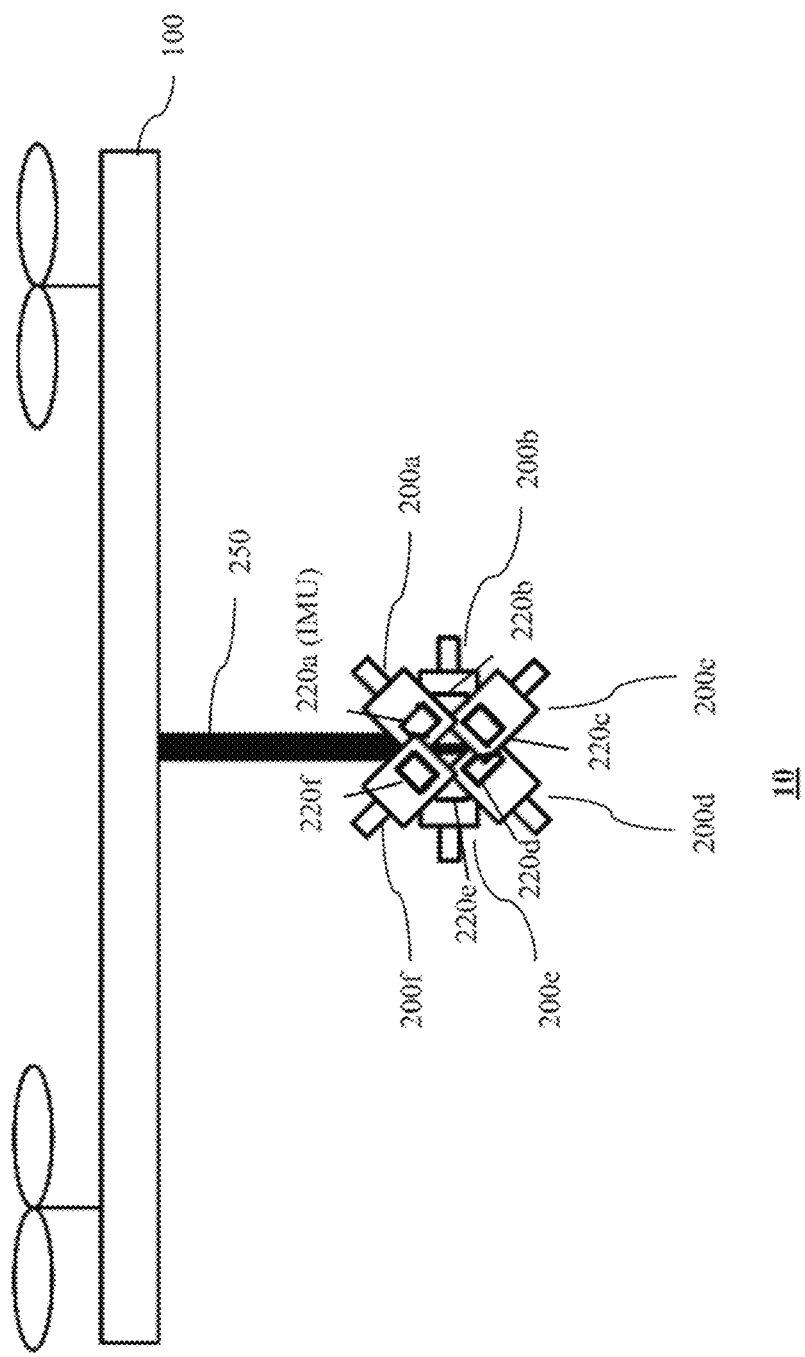
FIG. 3 is an exemplary diagram illustrating another embodiment of the system of FIG. 1, wherein movement data is obtained using a plurality of IMUs that are mounted to respective imaging devices.

Turning now to FIG. 3, an exemplary configuration of multiple imaging devices 200a-f mounted aboard a mobile platform 100 is shown. Each of the imaging devices 200a-f can be mounted at a fixed Euler angle ($\alpha$, $\beta$, $\varphi$) with respect to the mobile platform 100. The imaging devices 200a-f can be collectively configured to capture images 300 of the surroundings of the mobile platform 100. In some embodiments, the imaging devices 200a-f can be configured to have Euler angles ($\alpha$, $\beta$, $\varphi$) that allow panoramic coverage of the surroundings of the mobile platform 100. As shown in FIG. 3, each of the imaging devices 200a-f is associated with a respective IMU 220a-f. Each of the IMUs 220 is configured to ascertain a real-time position (for example, an FOV 230 or Euler angles) of an image sensor 210 of the respective imaging device 200. The positions of the image sensors 210 can be used for image stabilization by enabling correction of imaging differences between the image sensors 210, as further described below.

Figure 4:
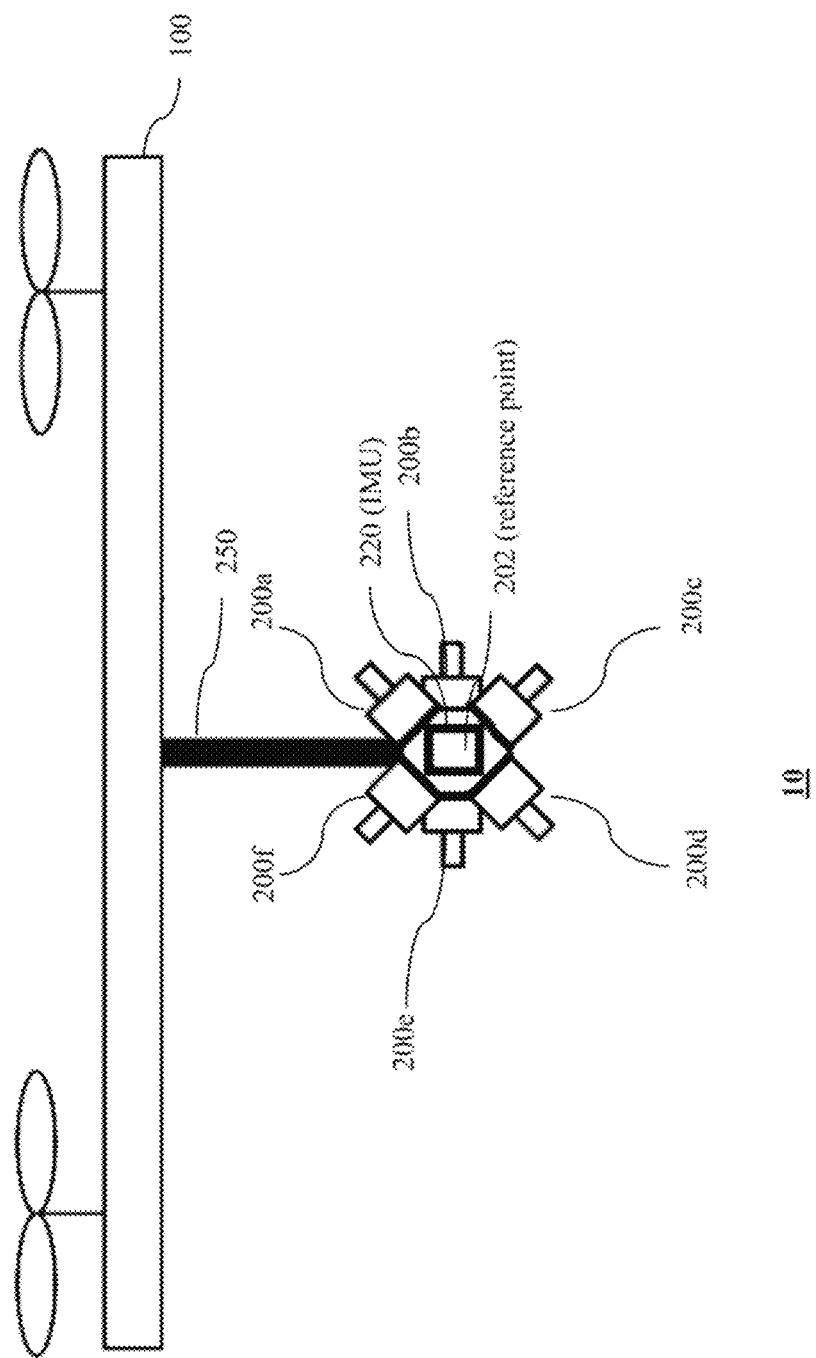
FIG. 4 is an exemplary diagram illustrating another embodiment of the system of FIG. 1, wherein movement data is obtained using an IMU that is mounted at a reference point of the mobile platform.

Turning now to FIG. 4, another exemplary configuration of multiple imaging devices 200a-f mounted aboard a mobile platform 100 is shown. In contrast to the configuration shown in FIG. 3, a single IMU 220 is used instead of multiple IMUs 220. The IMU 220 can be position at a known reference point 202, for example, at the center of the imaging devices 220a-f. Using IMU data from this single IMU 200, real-time positions (for example, an FOV 230 or Euler angles) of each of the imaging devices 200a-f can be ascertained based on the relative positions of the reference point 202 and the imaging devices 200a-f.

In some embodiments, as shown in FIGS. 3 and 4, the imaging devices 200a-f can be mounted with respect to the mobile platform 100 using a fixed mount 250, rendering the imaging devices 200a-f immobile relative to the mobile platform 100. The fixed mount 250 fixes the Euler angles ($\alpha$, $\beta$, $\varphi$) of each imaging device 200 with respect to the mobile platform 100, such that these quantities are constant values for purposes of image processing.

Figure 5:
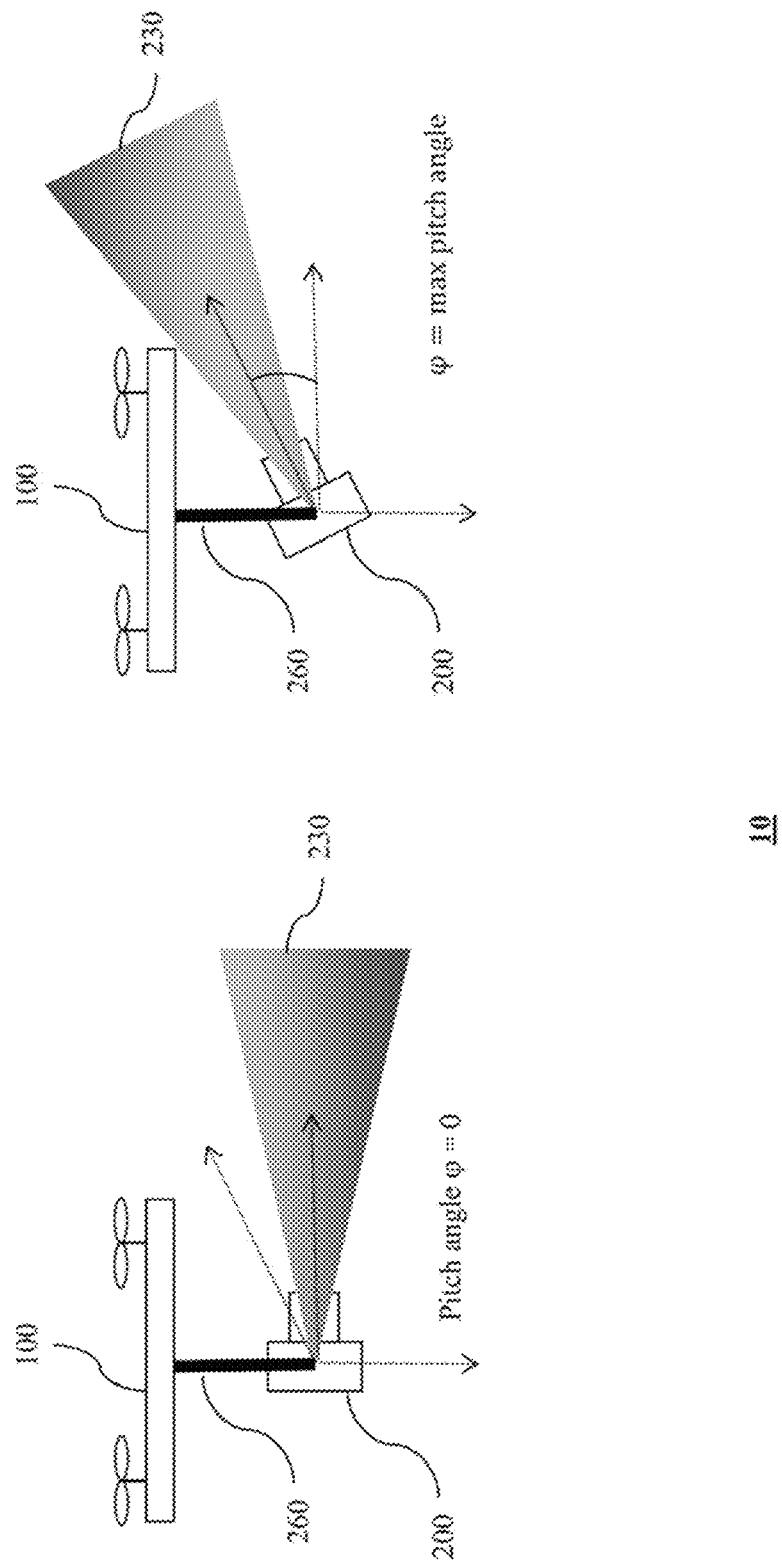
FIG. 5 is an exemplary diagram illustrating an embodiment of the system of FIG. 1, wherein movement data is obtained using an IMU that is mounted to the mobile platform using a gimbal.

Turning now to FIG. 5, another exemplary embodiment is shown in which one or more imaging devices 200 can be mounted with respect to the mobile platform 100 using a movable mount such as a gimbal 260 for precise positioning of the imaging devices 200 to a given set of Euler angles ($\alpha$, $\beta$, $\varphi$). The gimbal 260 can include one or more pivoted supports (not shown) that are mounted with respect to one or more axes of rotation, thereby allowing a mounted object to be rotationally independent with respect to a fixture to which the gimbal 260 is mounted. The manner of configuring and mounting the pivoted supports can vary and can include, for example, concentric ring structures and non-ring structures. Depending on the number of degrees of freedom desired, the gimbal 260 can include any suitable number, including one, two, or three, pivoted supports. The gimbal 260 can include various mechanical apparatus as needed, such as ball bearings, tracks, actuators, and the like. The gimbal 260 can be configured to respond to external commands (for example, from a processor) directing movement of the imaging devices 200. In some embodiments, the mobile platform can be moved (for example, rotated or tilted), individually or in combination with the gimbal 260, to provide rotation of the imaging device 200, as desired.

As shown on the left side of FIG. 5, the imaging device 200 is at a pitch angle $\varphi=0$ such that the viewing angle of the imaging device is parallel to the horizontal plane of the mobile platform 100. On the right side of FIG. 5, the imaging device 200 is tilted upward to a maximum pitch angle $\varphi_{max}$ at which the FOV 230 of the imaging device 200 is unobstructed by portions of the mobile platform 100. Obstruction of the FOV 230 can occur, for example, with one or more propellers or other protruding portions of the mobile platform 100. The maximum pitch angle $\varphi_{max}$ can advantageously be predetermined for any mobile platform imaging system 10, such that the imaging device 200 can be configured to avoid exceeding the maximum pitch angle $\varphi_{max}$.

Figure 6:
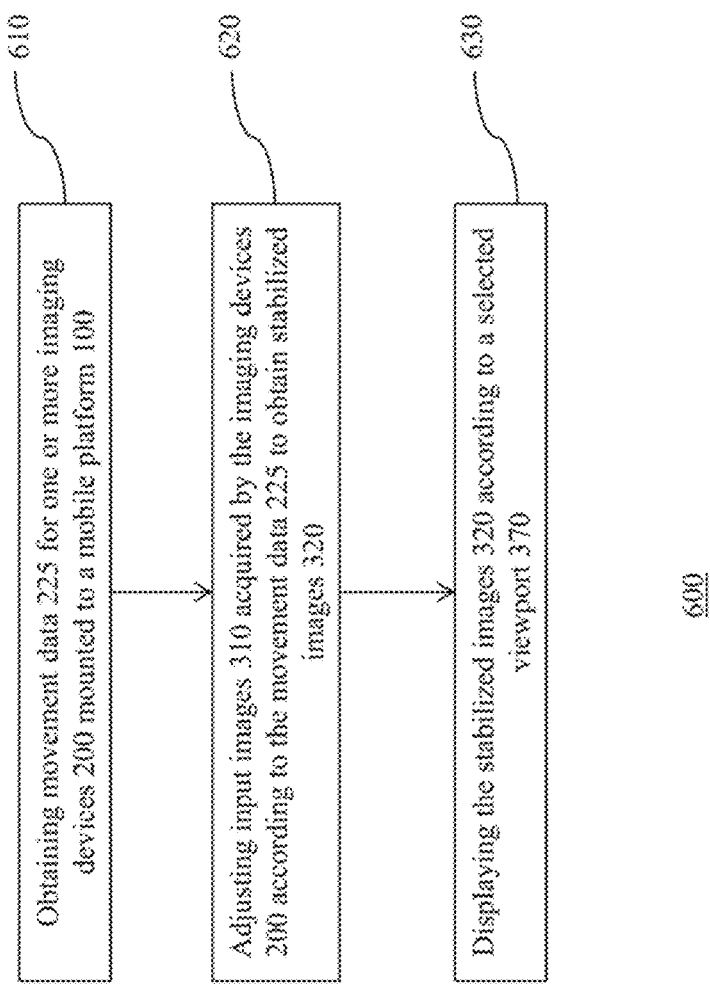
FIG. 6 is an exemplary top-level flow chart illustrating an embodiment of a method of image stabilization using the system of FIG. 1.

Turning now to FIG. 6, an exemplary method 600 is shown for image stabilization aboard a mobile platform 100. At 610, movement data 225 can be obtained for one or more imaging devices 200 mounted to a mobile platform 100. In some embodiments, the movement data 225 of the imaging devices 200 can be obtained using one or more IMUs 220. For example, as shown in FIG. 3, the movement data 225 can be obtained using a plurality of IMUs 220, wherein each of the plurality of IMUs 220 is mounted to one of the imaging devices 200 and configured to measure the position of the imaging device 200 to which the IMU 220 is mounted. Alternatively, and/or additionally, as shown in FIG. 4, movement data 225 of a reference point 202 on the mobile platform can be obtained using a single IMU 220. Movement data 225 for each of the imaging devices 200 can subsequently be interpolated based on a relative position between the imaging devices 200 and the reference point 202.

At 620, input images 310 that are acquired by the imaging devices 200 can be adjusted according to the movement data 225 to obtain stabilized images 320. In some embodiments, the input images 310 can be adjusted by applying a rolling shutter image stabilization based on the movement data 225 for the respective imaging device 200. Alternatively, and/or additionally, the input images 310 can be adjusted by applying a projective transform image stabilization based on the movement data 225 for the respective imaging device 200. As further detailed below, in some embodiments, the stabilized images 320 can be assembled into a larger image such as a panoramic image 350 (shown in FIG. 7). For example, an equirectangular projection can be applied to each of the stabilized images 320 to obtain equirectangular images 330 (shown in FIG. 7). The equirectangular images 330 can be stitched together to obtain a stabilized panoramic image 350.

At 630, the stabilized images 320 can be displayed according to a selected viewport 370. For example, stabilized panoramic image 350 can be transmitted to a user terminal 400 and displayed according to the viewport 370. The viewport 370 can be selected by as user 20. For example, the viewport 370 can be selected by the user 20 in a liveview terminal 450. Upon selection of the viewport 370, a liveview video 390 (shown in FIG. 7) comprising stabilized images 320 can be displayed to the user 20 based on selection of the viewport 370.

Figure 7:
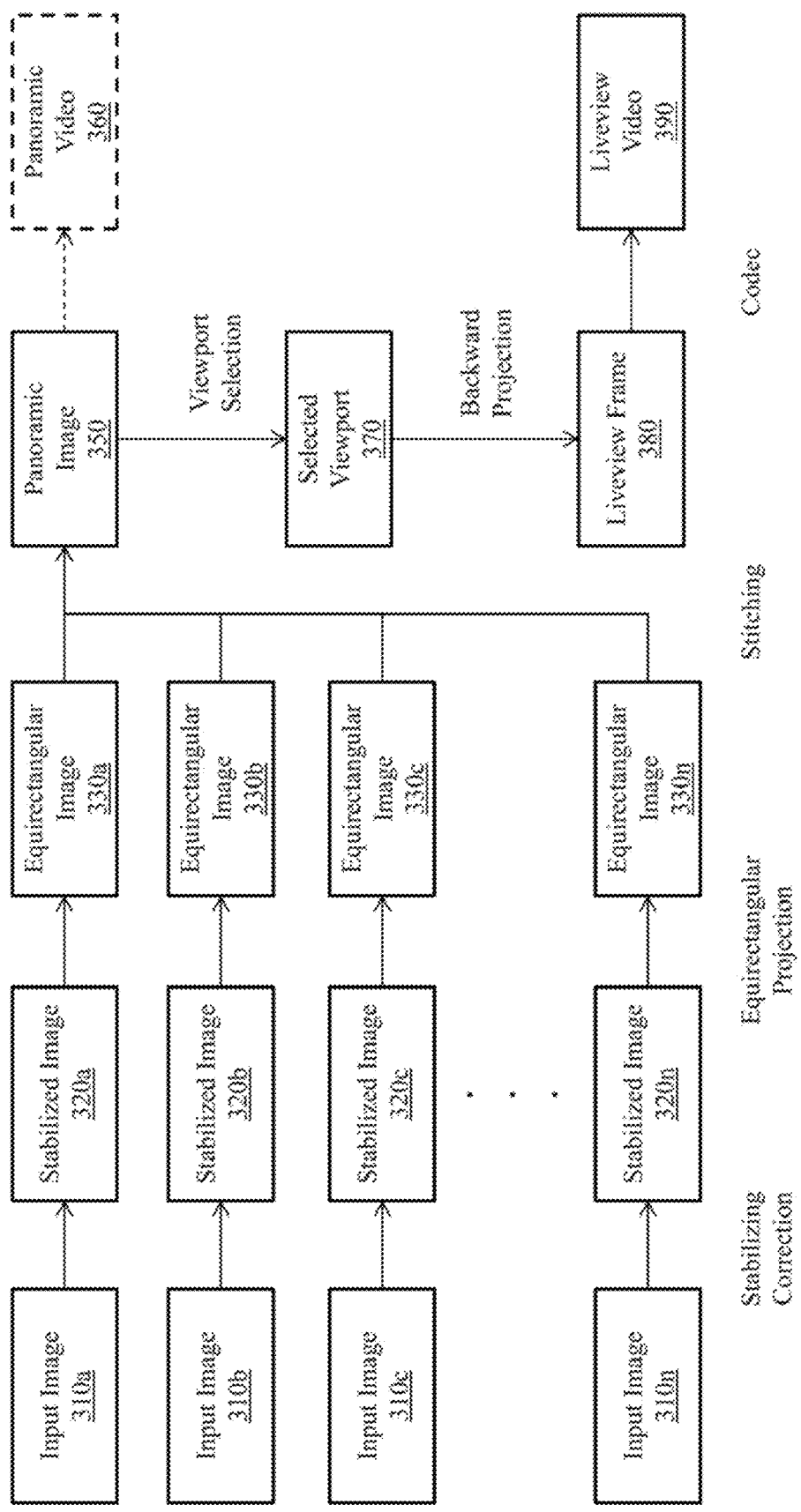
FIG. 7 is an exemplary flow chart illustrating an embodiment of the method of FIG. 6, wherein stabilized images can undergo an equirectangular projection prior to being stitched together into a panoramic image.

Turning now to FIG. 7, an exemplary image processing workflow for mobile platform image stabilization is shown in accordance with the present systems and methods. One or more input images 310a-n can be acquired by corresponding imaging devices 200 (shown in FIG. 1). The input images 310a-n can, for example, be synchronized or timestamped for each of processing into video frames, as desired. The input images 310a-n can be stabilized by applying a stabilizing correction to each of the input images 310a-n individually. The stabilizing correction can include, for example, a rolling shutter image stabilization to correct for intra-frame blurring resulting from movement of the imaging devices 200. Alternatively, and/or additionally, the stabilizing correction can include a projection transformation image stabilization to correct for inter-frame blurring resulting from movement of the imaging devices 200.

After the input images 310a-n are individually stabilized, the stabilized images 320a-n can optionally be assembled into a larger image, such as a panoramic image 350. In some embodiments, as shown in FIG. 8, an equirectangular projection can be applied to the images (for example, the stabilized images 320a-n) to give equirectangular images 330a-n. Projection into equirectangular coordinates can advantageously facilitate stitching of the images into a panoramic image 350. In some embodiments, one or more panoramic images can be encoded (for example, using a codec) into a panoramic video 360. The panoramic video 360 can be stored in a memory 120 (shown in FIG. 2) for later viewing, as desired.

As further shown in FIG. 7, stabilized images 320 (for example, the panoramic image 350) can be displayed to a user 20 based on a selected viewport 370. The viewport 370 can be a selected region of the stabilized image 320 or panoramic image 350 that is of interest to the user 20, or otherwise chosen by default according to a liveview terminal 450 interacting with the user 200. Where the stabilized images 320 have been transformed according to an equirectangular projection, a backward projection can be applied to transform the images back to rectilinear coordinates. The stabilized images can be formatted for display according to the viewport 370 as one or more liveview frames 380. One or more of the liveview frames 380 can be encoded (for example, using a codec) into a liveview video 390 for display to the user 20.

Turning now to FIG. 8, an exemplary input image 310 is shown as depicting a moving scene 50 obtained using a rolling shutter imaging device 200. Forward movement of the object in the scene 50, as well as high-frequency motion and/or vibrations of the imaging device 200, results in a blurry appearance in the input image 310. In particular, for a rolling shutter imaging device 200, each line of the input image 310 is captured at different times when the fast moving object is at a different position, creating a shaking or "jelly-like" appearance in the input image 310. For example, exposure between successive lines of a rolling shutter imaging device 200 is typically on the order of tens of microseconds. Accordingly, exposure of the first and last lines of the rolling shutter imaging device 200 can be on the order of several milliseconds. Where objects move on a timescale that is similar to or smaller than this millisecond timescale, significant imaging distortion is likely to occur.

According to the example provided above, a rolling shutter image stabilization can be applied to the input image 310 correct for intra-frame blurring. The rolling shutter image stabilization can be performed according to movement data 225 of each of the one or more imaging devices 200 that are mounted to the mobile platform 100. In particular, each of the imaging devices 200 can have movement in six degrees of freedom: three rotational (yaw, pitch, and roll) as well as three translational (x, y, and z). Where the mobile platform 100 is applied for imaging of distant objects, image distortions largely result from rotational movement of the imaging devices 200. Hence, a rolling shutter image stabilization can be performed using the movement data 225 by the following exemplary method. Let the input image 310 be represented in three-dimensional coordinates as the vector X, the physical coordinates of the corresponding object be represented as x, the camera parameter matrix as K, and the rotation matrix is R(t). Then we have the following relationship:

$$x = KR(t)X \quad \text{Equation (1)}$$

Under the assumption that the imaging device 200 acquires lines of the input image 310 at intervals $\Delta t$, the first line is obtained time $t_1$, the resolution of the image sensor 210 for the imaging device 200 has dimensions M×N, the physical coordinates x(i) corresponding to the ith line of the input image 310 can be represented as:

$$x(i) = KR(i\Delta t + t_1)X \quad \text{Equation (2)}$$

Where the first line and the ith line of the input image 310 are exposed at the same time (for example, for a global shutter imaging device 200), the physical coordinates corresponding to the input image 310 can be represented as:

$$x_0(i) = KR(t_1)X \quad \text{Equation (3)}$$

Accordingly, the rolling shutter image stabilization can be performed as follows:

$$x_0(i) = KR(t_1)R^T(i\Delta t + t_1)K^{-1}x(i) \quad \text{Equation (4)}$$

Note that, supposing the first line and ith line of the input image 310 are obtained after a rotation of $\Delta R_i$ by the imaging device 200, then:

$$R(i\Delta t + t_1) = R(t_1)\Delta R_i \quad \text{Equation (5)}$$

In particular, where the yaw, pitch and roll of the imaging device 200 for the first line of the input image 310 are ($Y_1$, $P_1$, $R_1$) and the yaw, pitch and roll of the imaging device 200 for the ith line of the input image 310 are ($Y_i$, $P_i$, $R_i$), the changes in the yaw, pitch and roll of the imaging device 200 ($\Delta Y$, $\Delta P$, $\Delta R$) are given as follows:

$$\begin{cases} \Delta Y = Y_i - Y_1 \\ \Delta P = P_i - P_1 \\ \Delta R = R_i - R_1 \end{cases} \quad \text{Equation (6)}$$

The rotational matrix $\Delta R_i$ can be represented in Equation (7) below based on the changes in the yaw, pitch and roll of the imaging device 200 ($\Delta Y$, $\Delta P$, $\Delta R$) (or, equivalently, based on changes in the Euler angles ($\alpha$, $\beta$, $\varphi$) of the imaging device 200):

$$\Delta R_i = \begin{bmatrix} \cos \Delta Y \cos \Delta R - \sin \Delta R \sin \Delta Y \sin \Delta P & \cos \Delta Y \sin \Delta R + \cos \Delta R \sin \Delta Y \sin \Delta P & -\sin \Delta Y \cos \Delta P \\ -\sin \Delta R \cos \Delta P & \cos \Delta P \cos \Delta R & \sin \Delta P \\ \sin \Delta Y \cos \Delta R + \sin \Delta R \sin \Delta P \cos \Delta Y & \sin \Delta Y \sin \Delta R - \sin \Delta P \cos \Delta Y \cos \Delta R & \cos \Delta Y \cos \Delta P \end{bmatrix} \quad \text{Equation (7)}$$

The yaw, pitch and roll of the imaging device 200 (or equivalently, the Euler angles ($\alpha$, $\beta$, $\varphi$) of the imaging device 200) can be obtained based on the movement data 225 (for example, based on one or more IMUS 220 attached to the imaging device 200). The movement data 225 thereby enables a rolling shutter image stabilization to be performed on the input image 310 to obtain a stabilized image 320. In particular, each line of the input image 310 can be corrected according to movement data 225 of the imaging device 200 that is acquired at the same time as the line. In some embodiments, the movement data 225 can be synchronized with each line 311 of pixels of the input image 310 using the time synchronizer 130 (shown in FIG. 2). For example, supposing that the input image 310 includes 3000 lines 311 of pixels, and the acquisition time of each line 311 is 0.01 milliseconds. A single frame can therefore be acquired in 30 milliseconds. Where the movement data 225 is available at a rate of 1000 Hz, a single frame will correspond to 30 samplings of the movement data 225.

Figure 9:
FIG. 9 is an exemplary diagram illustrating another embodiment of a rolling shutter image correction using the system of FIG. 1, wherein lines of an input image are obtained with greater frequency than corresponding movement data.
Figure 10:
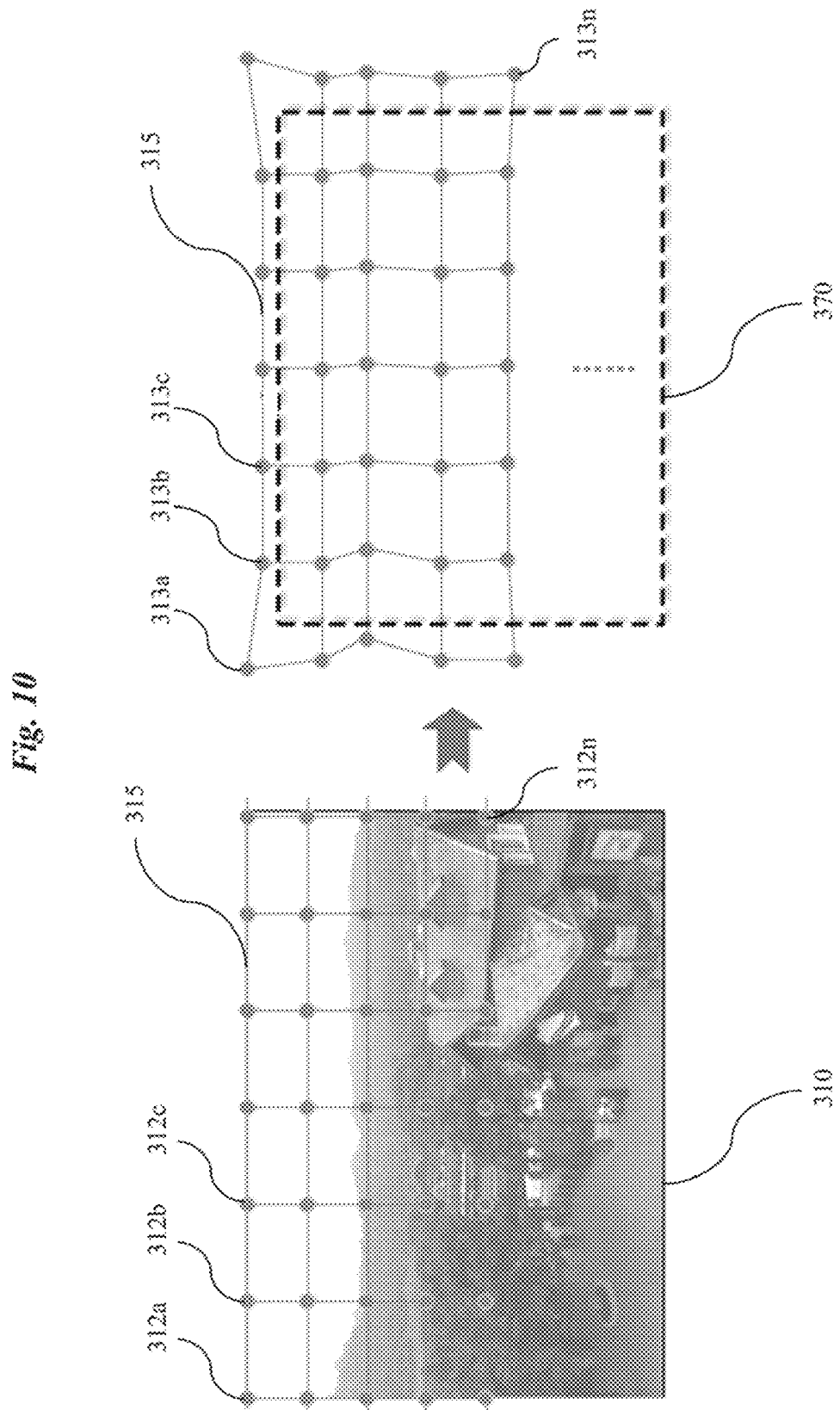
FIG. 10 is an exemplary diagram illustrating an embodiment of a projective transformation image correction using the system of FIG. 1.

Turning now to FIG. 9, a rolling shutter image stabilization is shown to be performed for each line 311 of pixels of the input image 310 where individual movement data 225 corresponding to each of the lines is not available. This situation can occur, for example, where the frequency of the movement data 225 is less than the frequency of the rolling shutter, as shown in FIG. 10. In FIG. 10, an exemplary input image 310 is shown in which the rolling shutter has a frequency of 10 microseconds, such that one line 311 of the input image 310 is obtained every 10 microseconds. In FIG. 10 the movement data 225 (depicted in bolded lines) is obtained more slowly than the frequency of the rolling shutter—for example, once every 20 microseconds.

Various methods can be used to perform rolling shutter image stabilization where individual movement data 225 corresponding to each of the lines 311 is not available. In some embodiments, a plurality of lines 311 of the input image 310 can be periodically corrected according to a frequency of the IMU 220 from which the movement data 225 is acquired. For example, suppose that first and second movement data 225 are received at 0 microseconds and 20 microseconds, respectively, relative to a time acquisition of the input image 310 begins. First, second, and third lines 311 of the input image 310 are acquired by the imaging device 200 at 0 microseconds, 10 microseconds, and 20 microseconds, respectively. Both the first and second lines 311 can be corrected according to the first movement data 225 received at 0 microseconds. Alternatively, each line 311 of the input image 310 can be corrected according to interpolated movement data 225 at an acquisition time of the line 311. For example, an interpolated movement data 225 can be found at 10 microseconds based on the first and second movement data 225 at 0 and 20 microseconds. The interpolated movement data 225 can be found by using a time-weighted average of the first and second movement data 225. The interpolated movement data 225 can then be used to correct the second line 311 that is acquired at 10 microseconds.

Turning now to FIG. 10, an exemplary projective transform is shown as being applied to an input image 310 for image stabilization. The projective transform can be used, for example, to correct for blurring within a given image or between different frames of a video. In the example shown in FIG. 11, a plurality of input points 312a-n can be selected on the input image 310. The input points 312 can be selected, for example, by interval sampling of pixels on the input image 310. In some embodiments, the input points 312 can be selected in a rectangular pattern at equidistant intervals (for example, 5 pixels, 10 pixels, 20 pixels, 50 pixels, 100 pixels, 200 pixels, or more). The input points 312 can be selected based on a preset horizontal interval and/or vertical interval. The horizontal interval can be the same as or different from the vertical interval. In some embodiments, a non-rectangular (for example, triangular) pattern of input points 312 can be selected. Alternatively, and/or additionally, some or all of the input points 312 can be selected randomly. The selected input points 312a-n can form a mesh 315 that can be used for image stabilization.

After selecting the mesh 315 of input points 312, each of the input points 312 having coordinates (u, v) can be mapped using a projective transform to a corresponding output point 313 having coordinates (x, y). The projective transform can be performed according to movement data 225 corresponding to the input points 312. The movement data can specify a current Euler angle (α, β, φ) for each of the input points 312a-n with reference to an objective Euler angle (α, β, φ)$_{obj}$ (also referred to herein as the "objective angle"). The objective angle (α, β, φ)$_{obj}$ can be a reference Euler angle to which Euler angles of the imaging devices 200 can be normalized for image stabilization. The objective angle (α, β, φ)$_{obj}$ can be defined, for example, based on a viewing angle selected by a user 20. Each input point 312 can be corrected according to a deviation between the current Euler angle (α, β, φ) and the objective angle (α, β, φ)$_{obj}$. For example, a reference rotational matrix R$_{ref}$ can be defined for the objective angle (α, β, φ)$_{obj}$ (as described in Equation (7)). Similarly, a current rotational matrix R$_{cur}$ can be defined for the current Euler angle (α, β, φ) for each of the input points 312. A rotational matrix R can be found as follows for performing a projective transform from coordinates (u, v) of an input point 312 to coordinates (x, y) of an output point 312:

$$R=R_{ref}*\text{inv}(R_{cur}) \qquad \text{Equation (8)}$$

Figure 11:
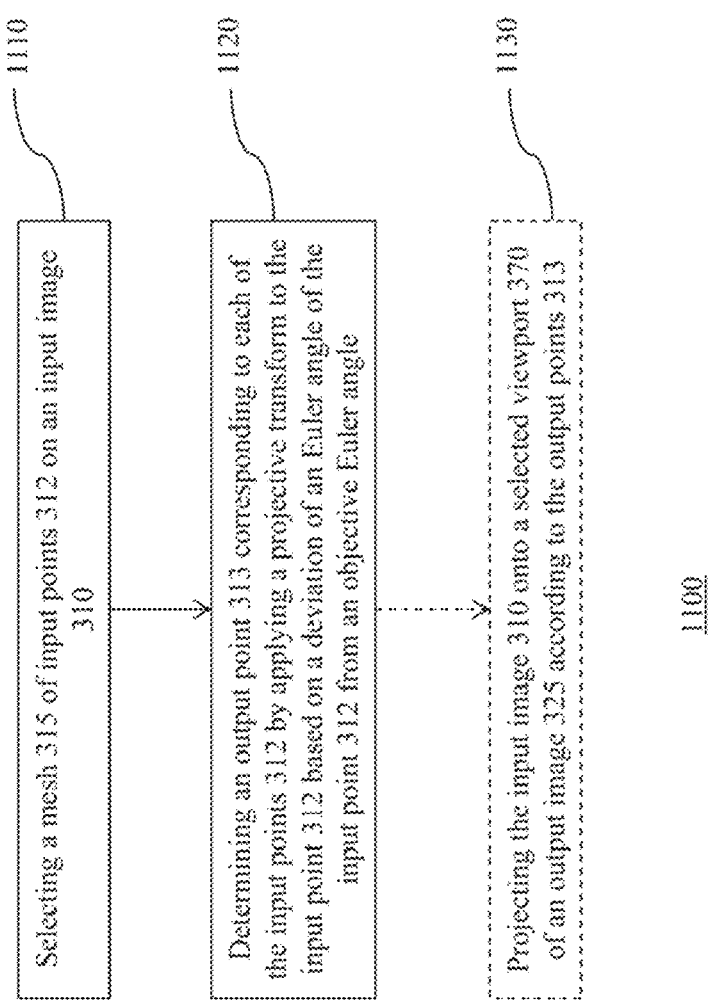
FIG. 11 is an exemplary flow chart illustrating an embodiment of the method of FIG. 6 for projective transformation image correction.

A projective transform can be applied to each of the input points 312a-n to obtain the mesh 315 of corresponding output points 313a-n. In some embodiments, as shown in FIG. 11, the output points can be found in a selected viewport 370. The selected viewport 370 can be a region that is smaller than the input image, such that image correction artifacts on edges of the image are avoided. The selected viewport 370 can be specified by a user 20. Alternatively, and/or additionally, the selected viewport 370 can be automatically selected by an imaging application.

In some embodiments, pre-processing of the input image 310 can be performed prior to the projective transform. For example, the input image 310 can be processed to correct lens distortion prior to the projective transform. Parameters for lens distortion correction can be obtained by calibration prior to the projective transform. Each of the input points 312 at coordinates (u, v) can be transformed according to the lens correction to obtain coordinates (u', v'). The coordinates (u', v') that have been corrected for lens distortion can subsequently undergo a projective transform, as described above.

Turning now to FIG. 11, an exemplary method 1100 of adjusting an input image 310 to obtain a corresponding stabilized image 320 is shown, in accordance with method 600 discussed above (shown in FIG. 6). At 1110, a mesh 315 of input points 312 can be selected on the input image 310. In some embodiments, the input points 312 can be selected by interval sampling of the input image 310. In some embodiments, the input points 312 can be selected in a rectangular pattern at equidistant intervals according to a preset horizontal interval and/or vertical interval. The horizontal interval can be the same as or different from the vertical interval. In some embodiments, a non-rectangular (for example, triangular) pattern of input points 312 can be selected. In some embodiments, some or all of the input points 312 can be selected randomly.

At 1120, an output point 313 corresponding to each of the input points 312 can be determined by applying a projective transform to the input point 312. In some embodiments, the projective transform can be applied based on a deviation of a current Euler angle (α, β, φ) of the input point 312 from an objective Euler angle (α, β, φ)$_{obj}$. For example, a rotational matrix R defined above in Equation (9) can be used to perform the projective transform from coordinates (u, v) of the input point 312 to corresponding coordinates (x, y) of the output point 313. Applying the projective transform according to the present systems and methods advantageously stabilizes an image between different frames of a video, as well as corrects for intra-frame blurring attributable to rolling shutter effects.

At 1130, after finding the output points 313, the input image 310 can optionally be projected onto a selected viewport 370 of an output image 325 according to the output points 313. For example, each polygon on the input image 310 defined by a set of neighboring input points 312 can be transformed into a corresponding polygon on the selected viewport 370 according to the corresponding output points 313. The projection can be performed in accordance with methods known in the art, such as methods used for graphics processing and transformation.

Figure 12:
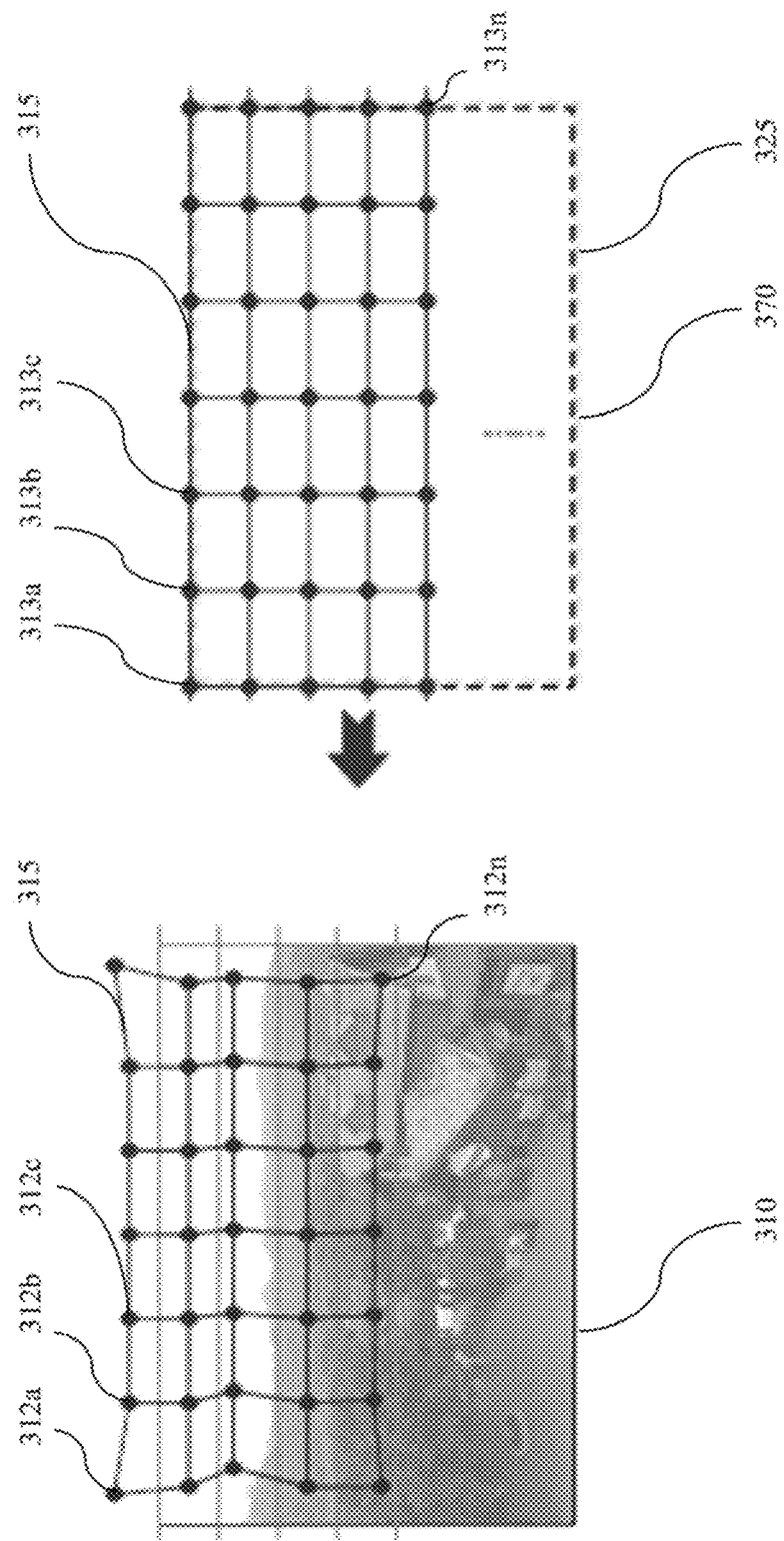
FIG. 12 is an exemplary diagram illustrating another embodiment of a projective transformation image correction using the system of FIG. 1.

Turning now to FIG. 12, an exemplary reverse projective transform is shown as being applied to an input image 310 for image stabilization. The reverse projective transform can be used, for example, to correct for blurring within a given image or between different frames of a video. In the example shown in FIG. 12, a plurality of output points 313a-n can be selected on a selected viewport 370 of an output image 325. The output points 313 can be selected, for example, by interval sampling of pixels within the selected viewport 370. For example, the output points 313 can be selected in a rectangular pattern at equidistant intervals (for example, 5 pixels, 10 pixels, 20 pixels, 50 pixels, 100 pixels, 200 pixels, or more). The output points 313 can be selected based on a preset horizontal interval and/or vertical interval. The horizontal interval can be the same as or different from the vertical interval. In some embodiments, a non-rectangular (for example, triangular) pattern of output points 313 can be selected. Alternatively, and/or additionally, some or all of the output points 313 can be selected randomly. The selected output points 313*a-n* can form a mesh 315 that can be used for image stabilization.

As shown in FIG. 12, a set of input points 312*a-n* that correspond to the output points 313*a-n* can be selected on the input image 310. After selecting the mesh 315 of output points 313, each of the output points 313 having coordinates (x, y) can be mapped using a reverse projective transform to a corresponding input points 312 having coordinates (u, v). The projective transform can be performed according to movement data 225 corresponding to the input points 312. As described above with reference to FIG. 10, the movement data 225 can specify a current Euler angle ($\alpha$, $\beta$, $\varphi$) for each of the input points 312*a-n* with reference to an objective angle ($\alpha$, $\beta$, $\varphi$)$_{obj}$. Each output point 313 can be corrected according to a deviation between the current Euler angle ($\alpha$, $\beta$, $\varphi$) and the objective angle ($\alpha$, $\beta$, $\varphi$)$_{obj}$. For example, similar to the projective transform described above with reference to FIG. 10, a reverse projective transform can be defined using a rotational matrix R from coordinates (x, y) of an output point 313 back to coordinates (u, v) of an input point 313:

$$R = R_{cur} * \text{inv}(R_{ref}) \quad \text{Equation (9)}$$

Wherein $R_{ref}$ is a reference rotational matrix for the objective angle ($\alpha$, $\beta$, $\varphi$)$_{obj}$ (as described in Equation (7)), and $R_{cur}$ is a current rotational matrix for the current Euler angle ($\alpha$, $\beta$, $\varphi$) for each of the input points 312.

In some embodiments, the input points 312 can be found from the output points 313 using an iterative process. For example, an input point 312 can be initialized as having the same coordinates as the corresponding output point 313. Stated somewhat differently, the initial coordinates of the input point 312 can be set to ($u_0$, $v_0$)=(x, y) at the beginning of the iterative process. Movement data 225 having Euler angle ($\alpha_0$, $\beta_0$, $\varphi_0$) corresponding to the initial input point 312 can subsequently be obtained. A reverse projective transform can then be performed according to Equation (9), above, to obtain a new set of coordinates ($u_1$, $v_1$) for the input point 312. In some embodiments, a reverse lens distortion can be performed, as well, in accordance with predetermined lens correction parameters (see above discussion referencing FIG. 11). The process can be repeated, as necessary, for k iterations until coordinates ($u_k$, $v_k$) for the input point 312 are obtained. The process can be halted, for example, when the coordinates of the input point 312 converge. For example, convergence of the input point 312 can be determined by comparing the Euler angle ($\alpha_k$, $\beta_k$, $\varphi_k$) corresponding to the coordinates ($u_k$, $v_k$) of the input point 312 to the Euler angle ($\alpha_o$, $\beta_o$, $\varphi_o$) corresponding to the coordinates (x, y) of the output point 313.

Figure 13:
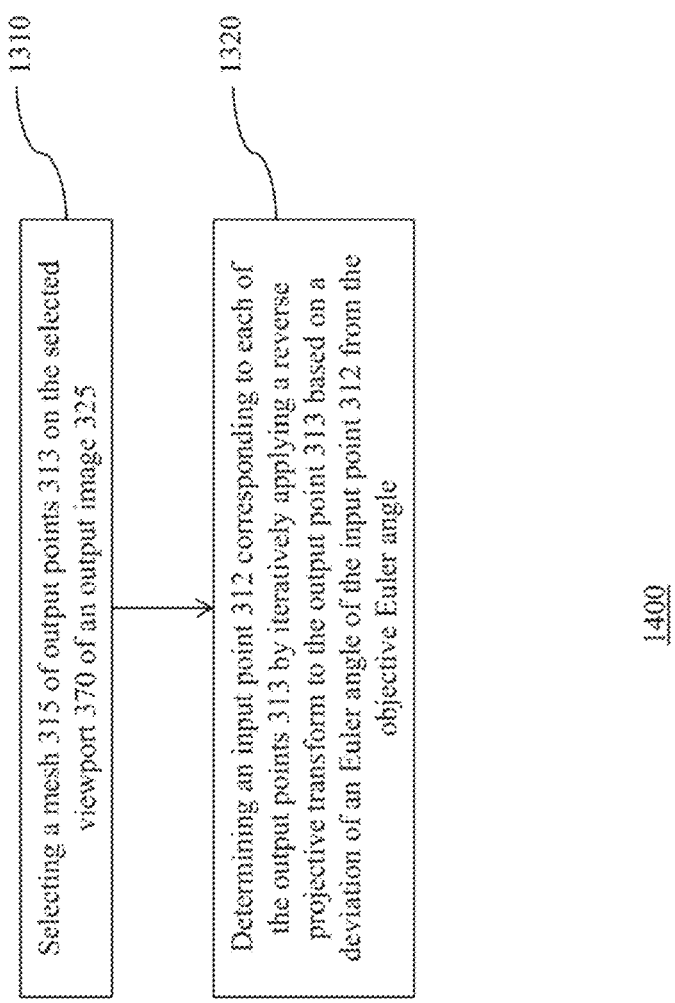
FIG. 13 is an exemplary flow chart illustrating another embodiment of the method of FIG. 6 for projective transformation image correction.

Turning now to FIG. 13, an exemplary method 1300 of adjusting an input image 310 to obtain a corresponding stabilized image 320 is shown, in accordance with method 700 discussed above (shown in FIG. 6). At 1310, a mesh 315 of output points 313 can be selected on a selected viewport 370 of an output image 325. In some embodiments, the output points 313 can be selected by interval sampling within the selected viewport 370. In some embodiments, the output points 313 can be selected in a rectangular pattern at equidistant intervals according to a preset horizontal interval and/or vertical interval. The horizontal interval can be the same as or different from the vertical interval. In some embodiments, a non-rectangular (for example, triangular) pattern of output points 313 can be selected. In some embodiments, some or all of the output points 313 can be selected randomly.

At 1320, an input point 312 corresponding to each of the output points 313 can be determined by iteratively applying a reverse projective transform to the output point 313. In some embodiments, the reverse projective transform can be applied based on a deviation of a current Euler angle ($\alpha$, $\beta$, $\varphi$) of the input point 312 from an objective Euler angle ($\alpha$, $\beta$, $\varphi$)$_{obj}$. For example, a rotational matrix R defined above in Equation (9) can be used to perform the reverse projective transform from coordinates (x, y) of the output point 313 back to corresponding coordinates (u, v) of the input point 312. The iterative application of the reverse projective transform can be repeated until the coordinates (u, v) of the input point 312 converge.

In some embodiments, a reverse lens correction transform can be applied to each of the output points to correct for lens distortion. Parameters for lens distortion correction can be obtained by calibration prior to the reverse lens correction transform. Each of the output points 312 at coordinates (x, y) can be reverse transformed according to the lens correction parameters to obtain coordinates (u', v'). The coordinates (u', v') that have been reverse corrected for lens distortion can subsequently undergo a reverse projective transform to coordinates (u, v), as described above.

Figure 14:
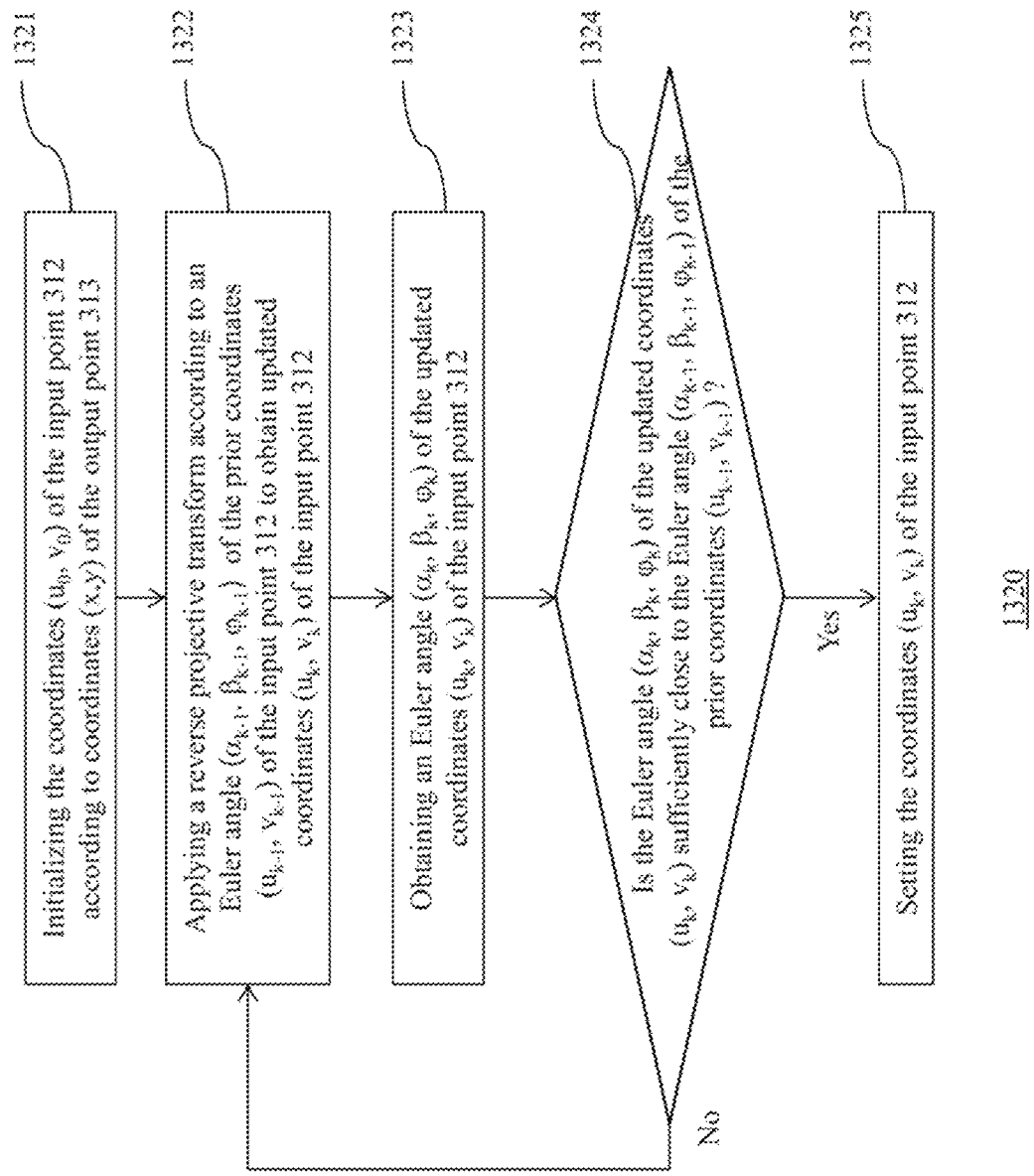
FIG. 14 is an exemplary flow chart illustrating an embodiment of the method of FIG. 13 for projective transformation image correction.

Turning now to FIG. 14, the iterative step 1320 of the reverse projective transform method described in FIG. 13 is shown with greater particularity. At 1321, initial coordinates ($u_0$, $v_0$) of the input point 312 can be initialized according to the coordinates (x, y) of the output point 313. At 1322, a reverse projective transform can be applied according to an Euler angle ($\alpha_{k-1}$, $\beta_{k-1}$, $\varphi_{k-1}$) of the prior coordinates ($u_{k-1}$, $v_{k-1}$) of the input point 312 to obtain updated coordinates ($u_k$, $v_k$) of the input point 312. At 1323, an Euler angle ($\alpha_k$, $\beta_k$, $\varphi_k$) of the updated coordinates ($u_k$, $v_k$) of the input point 312 can be obtained. At 1324, whether the Euler angle ($\alpha_k$, $\beta_k$, $\varphi_k$) of the updated coordinates ($u_k$, $v_k$) are sufficiently close to the Euler angle ($\alpha_{k-1}$, $\beta_{k-1}$, $\varphi_{k-1}$) of the prior coordinates ($u_{k-1}$, $v_{k-1}$) is determined. A predetermined threshold value for the distance between the updated Euler angle ($\alpha_k$, $\beta_k$, $\varphi_k$) and the prior Euler angle ($\alpha_{k-1}$, $\beta_{k-1}$, $\varphi_{k-1}$) can be used to determine whether the coordinates are sufficiently close. If the updated Euler angle ($\alpha_k$, $\beta_k$, $\varphi_k$) and the prior Euler angle ($\alpha_{k-1}$, $\beta_{k-1}$, $\varphi_{k-1}$) are sufficiently close, then, at 1325, the coordinates of the input point 312 can be set as the updated coordinates ($u_k$, $v_k$). If the updated Euler angle ($\alpha_k$, $\beta_k$, $\varphi_k$) and the prior Euler angle ($\alpha_{k-1}$, $\beta_{k-1}$, $\varphi_{k-1}$) are not sufficiently close, then another iterative of a reverse projective transform can be applied, at 1322.

In the above examples, an input image 310 is adjusted for image stabilization by means of a rolling shutter and/or projective transform image stabilization. These examples are provided for illustrative purposes only and are not intended to be limiting. Any adjustments for stabilizing an input image 310 can be used in the present systems and methods. For example, alternatively or in addition to the above methods, an input image 310 can be adjusted by matching features of the input image 310 with features of other input images 310 for stabilization. Features can be automatically detected in the input images 310 using, for example, edge detection, Shi & Tomasi corner detection, image binarization, SURF blob (Speeded Up Robust Features) detection, MSER blob (Maximally Stable Extremal Regions) detection, SIFT (Scale-Invariant Feature Transform) descriptors, FREAK (Fast REtinA Keypoint) descriptors, BRISK (Binary Robust Invariant Scalable Keypoints) descriptors, HOG (Histogram of Oriented Gradients) descriptors, and the like. Input images 310 can be adjusted so that a given feature or features remains at the same position, or moves at a steady rate, among multiple input images 310.

Figure 15:
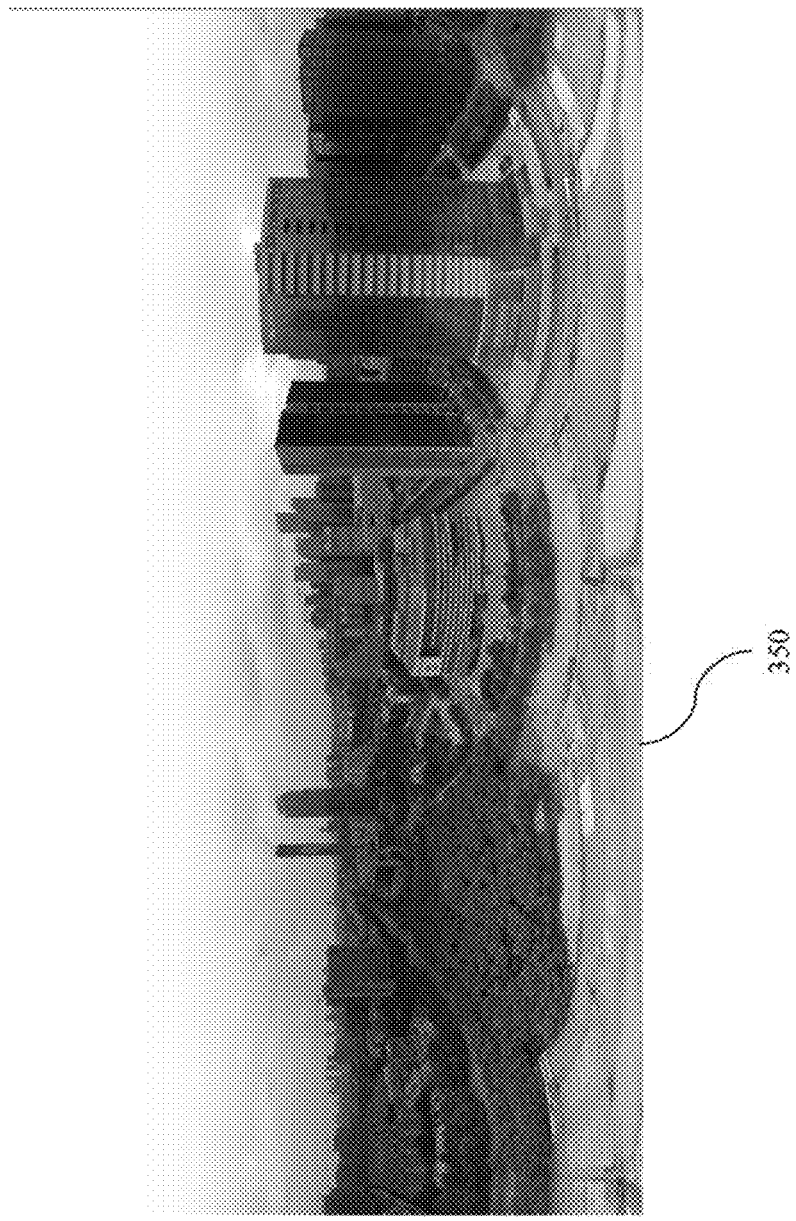
FIG. 15 is an exemplary diagram illustrating an embodiment of an equirectangular image generated using the system of FIG. 1.

Turning now to FIG. 15, an exemplary panoramic image 350 is shown as an equirectangular projection. As described above with respect to FIG. 7, an equirectangular projection can be applied to each of a plurality of stabilized images 320 to give corresponding equirectangular images 330. Equirectangular projection advantageously converts a curved surface into a flat two-dimensional surface to facilitate viewing, comparison, and assembly of the stabilized images 320. For example, the equirectangular projection can be implemented by using longitude as a horizontal axis and latitude as a vertical axis to "spread" points on a curved surface onto a corresponding flat surface. Specifically, an equirectangular projection can be implemented using the following exemplary process:

First, two-dimensional pixels having coordinates $(x_i, y_i)$ on an input image 310 (or, equivalently, on a stabilized image 320) can be projected into three dimensional coordinates $(x_w, y_w, z_w)$, as follows $$\begin{cases} x_w = \dfrac{x_i - W/2}{f} \\ y_w = \dfrac{y_i - H/2}{f} \\ z_w = -1 \end{cases} \qquad \text{Equation (10)}$$

Wherein W is the width of the input image 310, H is the height of the input image 310, and f is the equivalent focal length of the imaging device 200 after rectilinear projection. The three-dimensional coordinates can then be rotated according to an Euler angle of the imaging device 200 to corresponding coordinates $(x_w', y_w', z_w')$, as follows:

$$\begin{bmatrix} x_w' \\ y_w' \\ z_w' \end{bmatrix} = R \begin{bmatrix} x_w \\ y_w \\ z_w \end{bmatrix} \qquad \text{Equation (11)}$$

Wherein R is the rotational matrix. In cases where the imaging device 200 has yaw, pitch, and roll values of (Y, P, R) in global coordinates, the rotational matrix R can be represented as:

$$R = \begin{bmatrix} \cos Y \cos R - \sin R \sin Y \sin P & \cos Y \sin R + \cos R \sin Y \sin P & -\sin Y \cos P \\ -\sin R \cos P & \cos P \cos R & \sin P \\ \sin Y \cos R + \sin R \sin P \cos Y & \sin Y \sin R - \sin P \cos Y \cos R & \cos Y \cos P \end{bmatrix} \qquad \text{Equation (12)}$$

Figure 16:
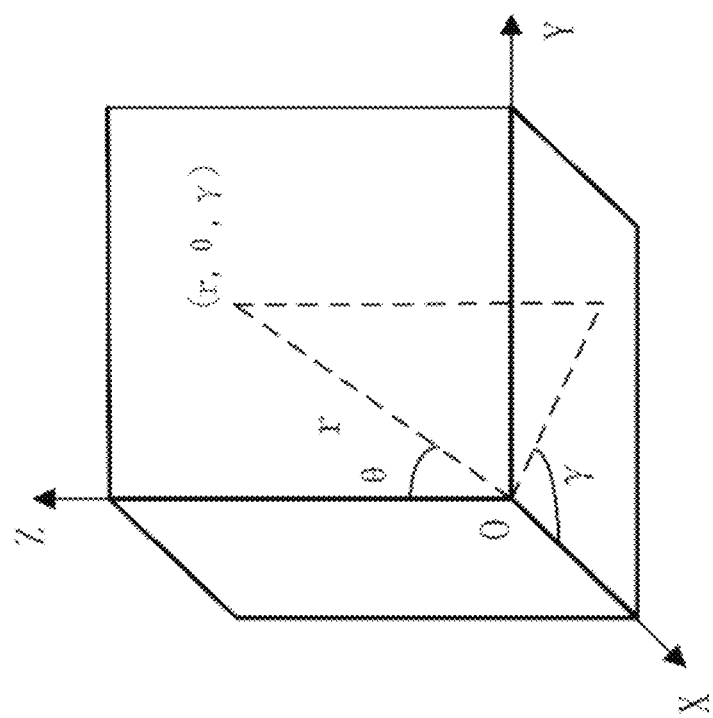
FIG. 16 is an exemplary diagram illustrating polar coordinates for equirectangular projection in accordance with the present systems and methods.

The three dimensional coordinates can subsequently be converted into polar coordinates in terms of $(r, \theta, \gamma)$ using the following conversion:

$$\begin{cases} r = \sqrt{x_w'^2 + y_w'^2 + z_w'^2} \\ \theta = \arctan\left(\dfrac{\sqrt{x_w'^2 + y_w'^2}}{z_w'}\right) \\ \gamma = \arctan\left(\dfrac{y_w'}{x_w'}\right) \end{cases} \qquad \text{Equation (13)}$$

Wherein the polar coordinates $(r, \theta, \gamma)$ are shown in FIG. 16.

Subsequently, the Euler angles $(\varphi, \beta)$ be determined as follows based on the polar coordinates:

$$\begin{cases} \varphi = 90° - \theta \\ \beta = \gamma \end{cases} \qquad \text{Equation (14)}$$

Finally, using the scaling value $\lambda$, the equirectangular coordinates $(\lambda\varphi, \lambda\beta)$ can be obtained.

Figure 17:
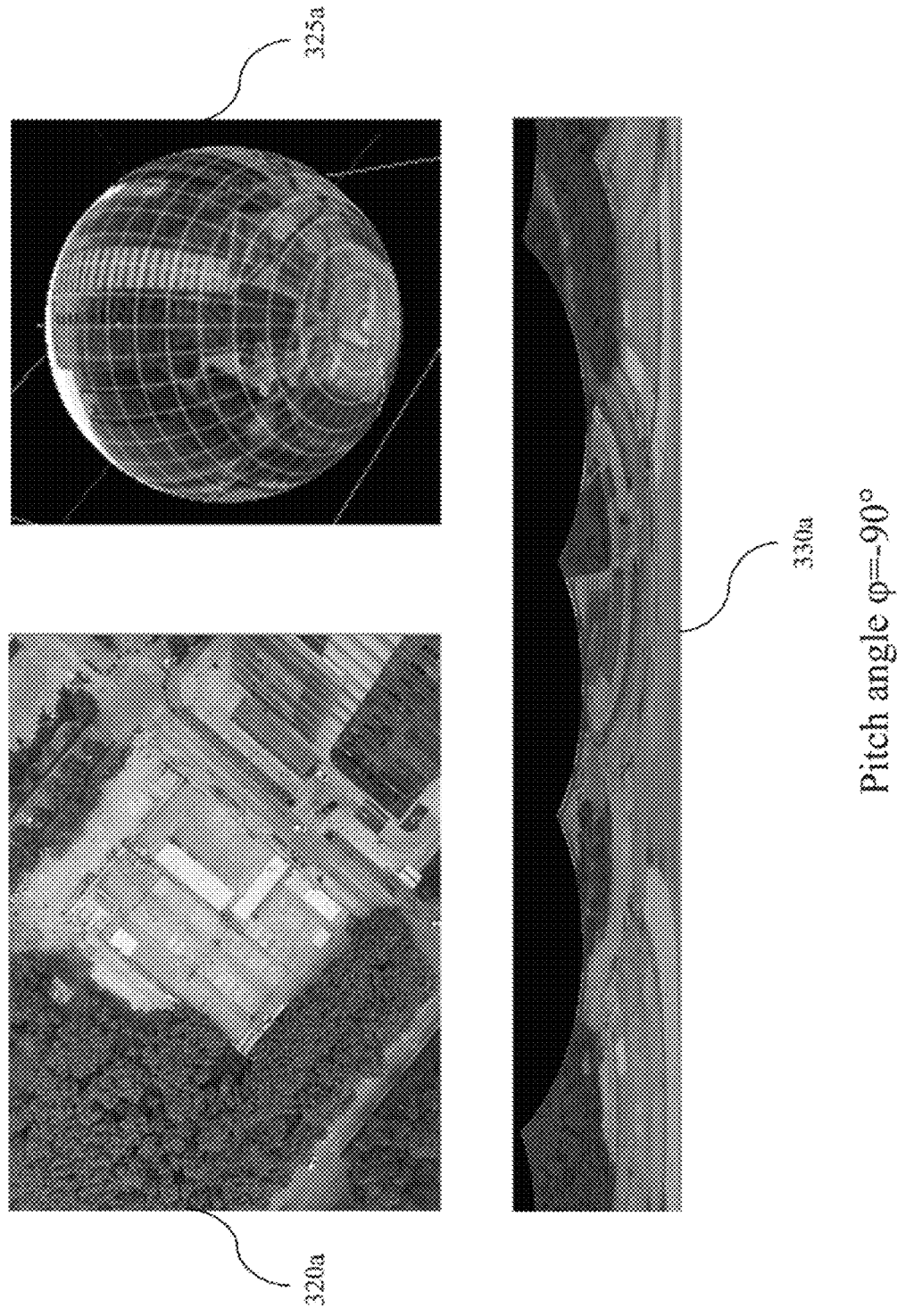
FIG. 17 is an exemplary diagram illustrating an embodiment of an equirectangular image generated using the system of FIG. 1 at a pitch angle of −90 degrees.
Figure 18:
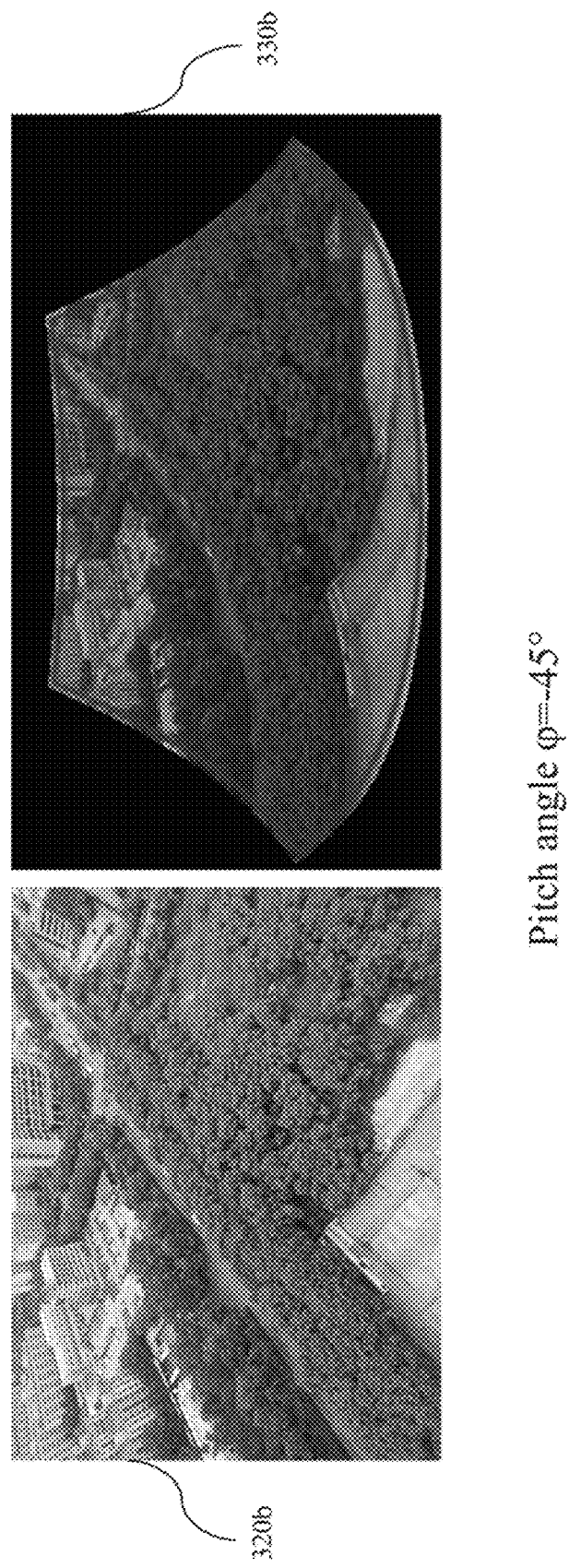
FIG. 18 is an exemplary diagram illustrating an embodiment of an equirectangular image generated using the system of FIG. 1 at a pitch angle of −45 degrees.
Figure 19:
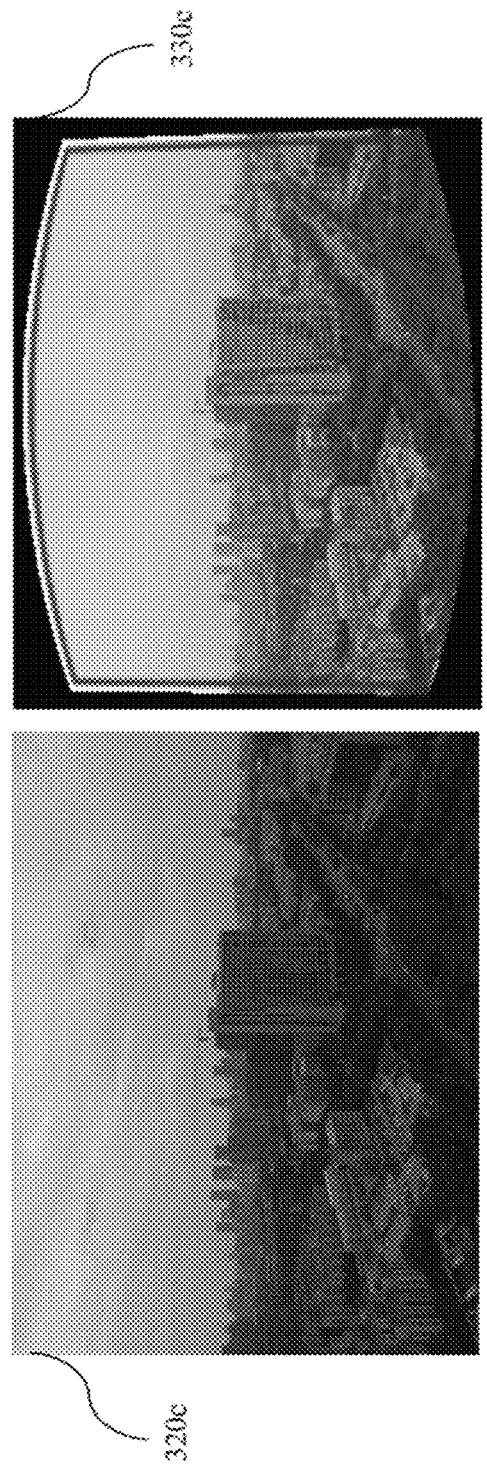
FIG. 19 is an exemplary diagram illustrating an embodiment of an equirectangular image generated using the system of FIG. 1 at a pitch angle of 0 degrees.
Figure 20:
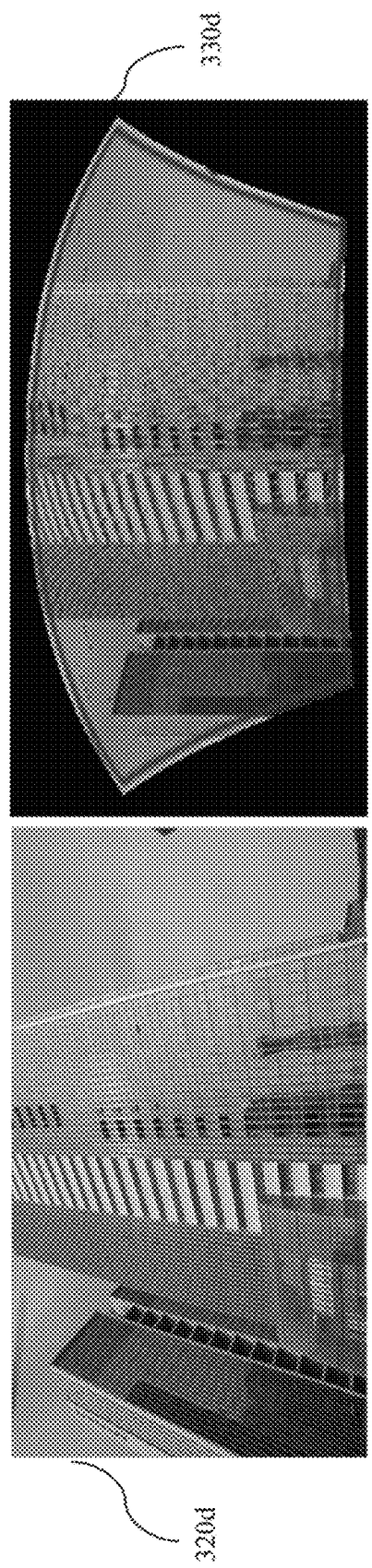
FIG. 20 is an exemplary diagram illustrating an embodiment of an equirectangular image generated using the system of FIG. 1 at a pitch angle of 30 degrees.

FIGS. 17-20 illustrate several exemplary input images 310 that are captured with a rectilinear lens at various pitch angles $\varphi$ and converted into corresponding equirectangular images 330. FIG. 17 shows on the left side an input image 310*a* that is captured using a rectilinear lens (not shown) at a pitch angle $\varphi=-90$ degrees—that is, the imaging device 200 is pointing straight downwards. The right side of FIG. 17 shows a corresponding image 325*a* that has been projected into three dimensions in accordance with the process described above, and is shown as a projection onto a globe having a curved surface. The input image 310*a* can subsequently be converted into a corresponding equirectangular image 330*a*, as shown at the bottom of FIG. 17. FIG. 18 shows an input image 310*b* that is at a pitch angle $\varphi=-45$ degrees. The input image 310*b* can be converted into a corresponding equirectangular image 330*b*. Likewise, FIG. 19 shows an input image 310*c* that is captured at a pitch angle $\varphi=0$ degrees—that is, the viewing angle of the imaging device 200 is parallel to the ground surface. The input image 310*c* can be converted into a corresponding equirectangular image 330*c*. Similarly, FIG. 20 shows an input image 310*d* that is captured at a pitch angle $\varphi=30$ degrees—that is, the imaging device 200 is facing toward the sky. The input image 310*d* can be converted into a corresponding equirectangular image 330*d*.

Figure 21:
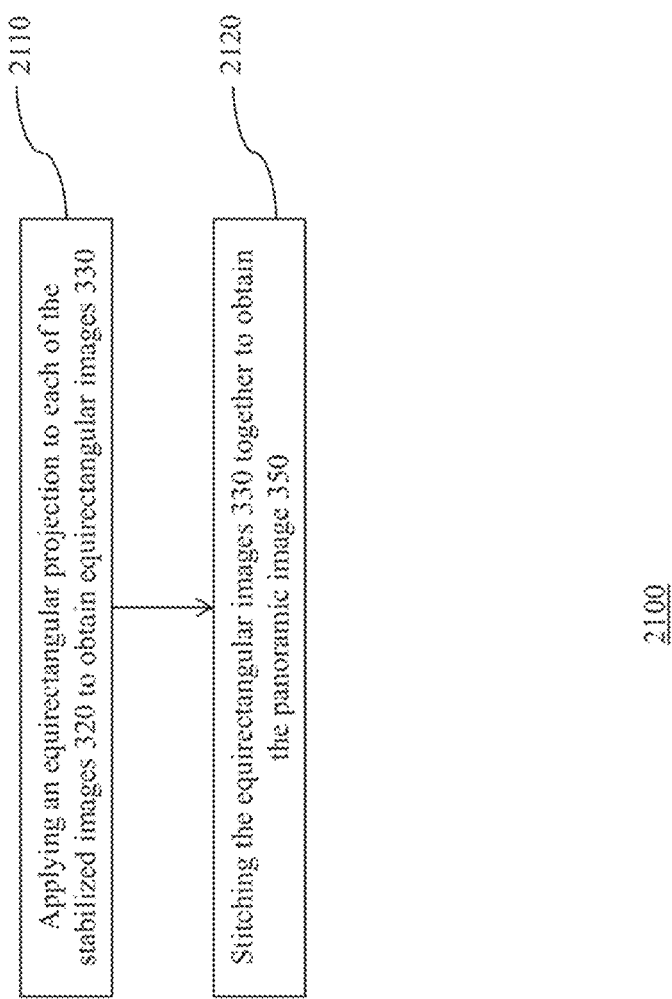
FIG. 21 is an exemplary flow chat illustrating an embodiment of a method for image stabilization in accordance with the method of FIG. 6.

In accordance with the above, in some embodiments, stabilized images 320 acquired by the one or more imaging devices can be assembled into a panoramic image 350. Turning now to FIG. 21, an exemplary method 2100 for assembling the stabilized images 320 into the panoramic image 350 is shown. At 2110, an equirectangular projection can be applied to each of the stabilized images 320 to obtain corresponding equirectangular images 330. The equirectangular projection advantageously "flattens" a curved surface to facilitate viewing, comparison, and assembly of the stabilized images 320. An exemplary method for applying the equirectangular projection is shown with reference to Equations (10)-(14), without limitation.

Figure 22:
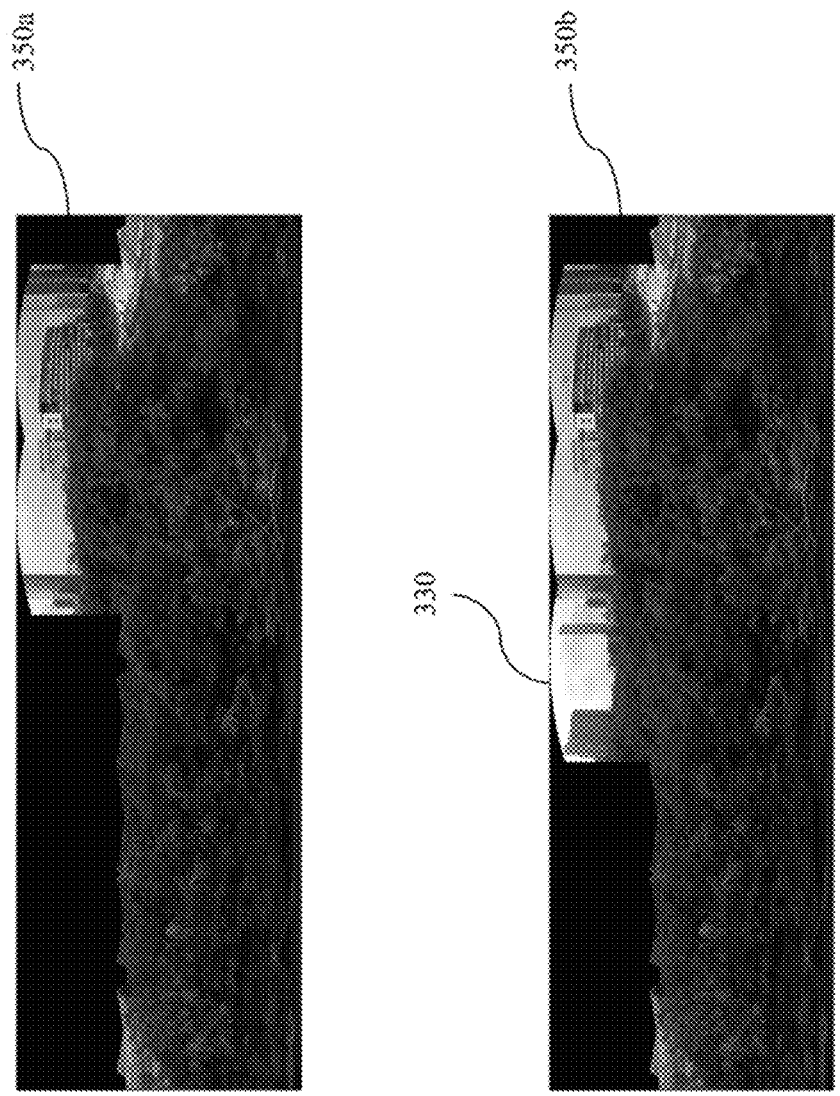
FIG. 22 is an exemplary diagram illustrating an embodiment of a method for assembling a panoramic image in accordance with the method of FIG. 6.

At 2120, the equirectangular images 330 can be stitched together to obtain the panoramic image 350. In some embodiments, the stitching can be performed according to an incremental stitching method, in which portions of the panoramic image 350 are incrementally added to form the full image. FIG. 22 illustrates an exemplary method of incremental stitching. The top of FIG. 22 shows an exemplary panoramic image 350 that is partially constructed using previous equirectangular images 330. As shown at the bottom of FIG. 22, the prior equirectangular images 330 can provide an anchor image that can be used to position successive equirectangular images 330 onto the panoramic image 350.

For purposes of ensuring a satisfactory stitching result, the successive equirectangular images 330 can have an overlapping area with the panoramic image 350 that is not less than a predetermined threshold. In some embodiments, the equirectangular image 330 can have an overlapping height with the panoramic image 350 that is no less than a predetermined ratio of the height of the equirectangular image 330. In some embodiments, the equirectangular image 330 can have an overlapping width with the panoramic image 350 that is no less than a predetermined ratio of the width of the equirectangular image 330. The predetermined ratio can be, for example, one-half, one-third, one-fourth, one-fifth, one-sixth, one-eighth, one-tenth, or any other suitable ratio. In some embodiments, the predetermined ratio can be the same for the overlapping height and for the overlapping width. In other embodiments, the predetermined ratio can be different for the overlapping height and for the overlapping width. In some embodiments, the equirectangular image 330 can have a predetermined area of overlap with adjoining regions panoramic image 350. The area of overlap can be no less than a predetermined ratio of the area of the equirectangular image 330. The predetermined ratio can be, for example, one-half, one-third, one-fourth, one-fifth, one-sixth, one-eighth, one-tenth, or any other suitable ratio.

In some embodiments, an Euler angle $(\alpha, \beta, \varphi)$ corresponding to the imaging device 200 that acquired the equirectangular image 330 can be used to facilitate stitching the equirectangular images 330 into a panoramic image 350. For example, Euler angles $(\alpha, \beta, \varphi)$ can be obtained for each of a plurality of equirectangular images 330 that are used to assemble a panoramic image 350. To stitch a given equirectangular image 330 into a panoramic image 350, the Euler angles $(\alpha, \beta, \varphi)$ of the equirectangular image 330 can be compared to Euler angles $(\alpha, \beta, \varphi)$ of neighboring images of the panoramic image 350. A horizontal and/or vertical placement of the equirectangular image 330 relative to the panoramic image 350 can be determined based on the comparison of the Euler angles $(\alpha, \beta, \varphi)$.

Figure 23:
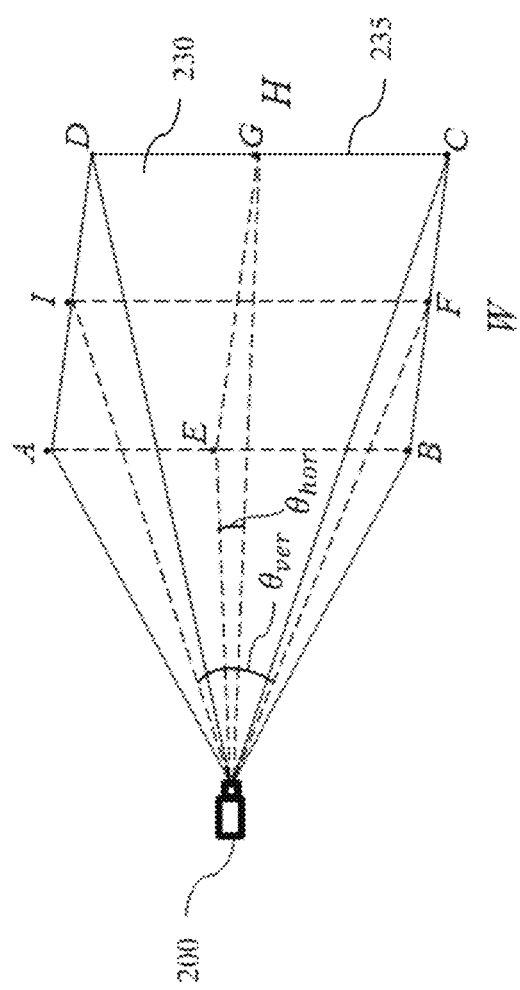
FIG. 23 is an exemplary diagram illustrating another embodiment of a method for assembling a panoramic image in accordance with the method of FIG. 6.

Turning now to FIG. 23, an exemplary technique for configuring one or more imaging devices 200 to obtain overlapping imaging coverage is illustrated. The technique can be used to determine a configuration of multiple imaging devices 200 for panoramic imaging, as shown in FIGS. 3 and 4. Alternatively, and/or additionally, the technique can be used to determine movement of one or more mobile imaging devices 200 for panoramic imaging, as shown in FIG. 5. In some embodiments, the technique can enable overlapping FOVs 230 between images 300 acquired by different imaging devices 200 or by images 300 acquired at multiple positions of the same imaging device 200. In some embodiments, multiple overlapping FOVs 230 acquiring images 300 can be assembled into a panoramic image 350 (shown in FIG. 7) without blind spots.

The imaging device 200 is shown as having an exemplary imaging plane 235 that is based on a horizontal FOV angle $\theta_{hor}$, and a vertical FOV angle $\theta_{ver}$. For purposes of ensuring horizontal overlap between adjacent images 300, a number $M_0$ of images in a full rotation at a pitch angle $\varphi=0$ can be calculated, for example, based the horizontal FOV angle $\theta_{hor}$.

$$M_0 = \left\lceil \frac{360}{(1-\sigma)\theta_{hor}} \right\rceil \qquad \text{Equation (15)}$$

Wherein $\sigma$ represents a ratio of an overlapping area to any of two horizontally adjacent images. The overlap $\sigma$ can be, for example, one-fourth of a width of any one of two horizontally adjacent images, or one-fourth of an area any one of two horizontally adjacent images. In some embodiments, $\sigma$ can be either decreased or increased to adjust the predetermined horizontal overlapping area. For example, $\sigma$ can be a value within a range between one-eighth and one-half. Values of M can be found for other values of the pitch angle $\varphi$ in similar fashion.

Similarly, with respect to positioning of the imaging device(s) 200 an upward or downward direction, a number of image rows N can be calculated, for example, based the vertical FOV angle $\theta_{ver}$. For example, where the overlap $\sigma=\frac{1}{4}$, N can be found as:

$$N = \left\lceil \frac{90}{\frac{3}{4}\theta_{ver}} \right\rceil \qquad \text{Equation (16)}$$

Likewise, the value of N can be adjusted for other values of the pitch angle $\varphi$.

Figure 24:
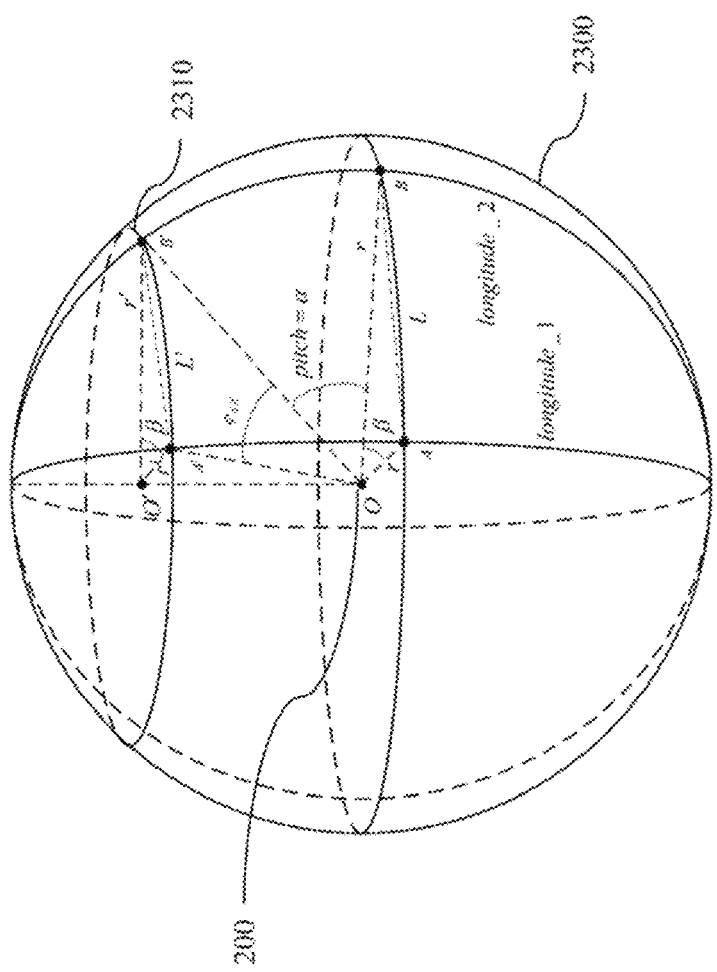
FIG. 24 is an exemplary diagram illustrating yet another embodiment of a method for assembling a panoramic image in accordance with the method of FIG. 6.

Turning now to FIG. 24, an alternative embodiment of a method for using one or more imaging devices 200 to obtain overlapping images is illustrated in a global view. As shown in FIG. 24, the imaging device 200 can be positioned at a center O of a globe 2300 having radius r. The surface of the globe 2300 can be sectioned by longitude lines and latitude lines (or circles). A first longitude line can be represented by longitude_1, and a second longitude line can be represented by longitude_2. The first and second longitude lines can be separated by a longitude angle $\beta$ that can be any value within a range of zero degrees to one hundred and eighty degrees, inclusive. An arc section between the first and second longitude lines can have a length L. When a light ray enters the imaging device 200 at a pitch angle $\alpha$, the pitch angle $\alpha$ can correspond to a horizontal section circle 2310. The horizontal section circle 2310 can have a radius r'. An arc section of the horizontal section circle 2310 between first and second longitude lines can have a length L'. The following relationship can exist:

$$r'=r \cos \alpha \qquad \text{Equation (17)}$$

Because a triangle OA'B' and a triangle O'A'B' are two isosceles triangles with a common base, the following relationship can exist:

$$2\,r'\sin\frac{\beta}{2} = 2r\,\cos\frac{\varphi_{A'B'}}{2} \qquad \text{Equation (18)}$$

The following relationship can be deduced from the above relationship:

$$\varphi_{A'B'} = 2\arcsin\left(\cos\alpha\,\sin\frac{\beta}{2}\right) \qquad \text{Equation (19)}$$

Equivalently, the following relationship can exist:

$$\beta = 2 \arcsin\left(\frac{\sin\frac{\varphi_{A'B'}}{2}}{\cos\alpha}\right) \quad \text{Equation (20)}$$

Figure 25:
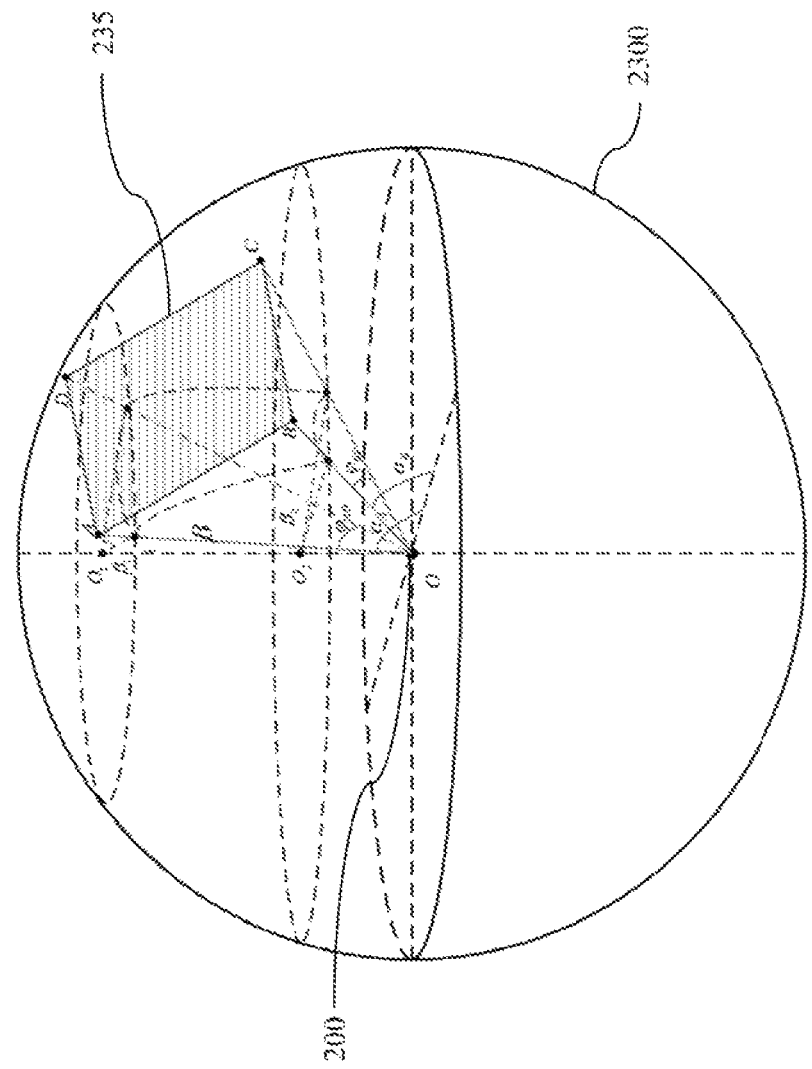
FIG. 25 is an exemplary diagram illustrating yet another embodiment of a method for assembling a panoramic image in accordance with the method of FIG. 6.

Turning now to FIG. 25, another alternative embodiment of a method for using one or more imaging devices 200 to obtain overlapping images is illustrated in a global view. An imaging device 200 located at point O is shown as having an upward pitch angle. The imaging device 200 is shown as having an imaging plane 230 as a shaded area ABCD on the surface of a globe 2300. A corresponding space spherical area can be a curved area defined by the four points A, B, C, D on the spherical surface. A number of images needed for at this upward pitch angle of the imaging device 200 can be determined as:

$$M_0 = \text{MAX}\left(\left\lceil\frac{360}{\frac{3}{4}\beta_1}\right\rceil, \left\lceil\frac{360}{\frac{3}{4}\beta_2}\right\rceil\right) \quad \text{Equation (21)}$$

Wherein $\beta_1$ refers to an angle between two lines in a section plane corresponding to the upper two sides of the shaded area ABCD, and $\beta_2$ refers to an angle between two lines in a section plane corresponding to the lower two sides of the shaded area ABCD.

Figure 26:
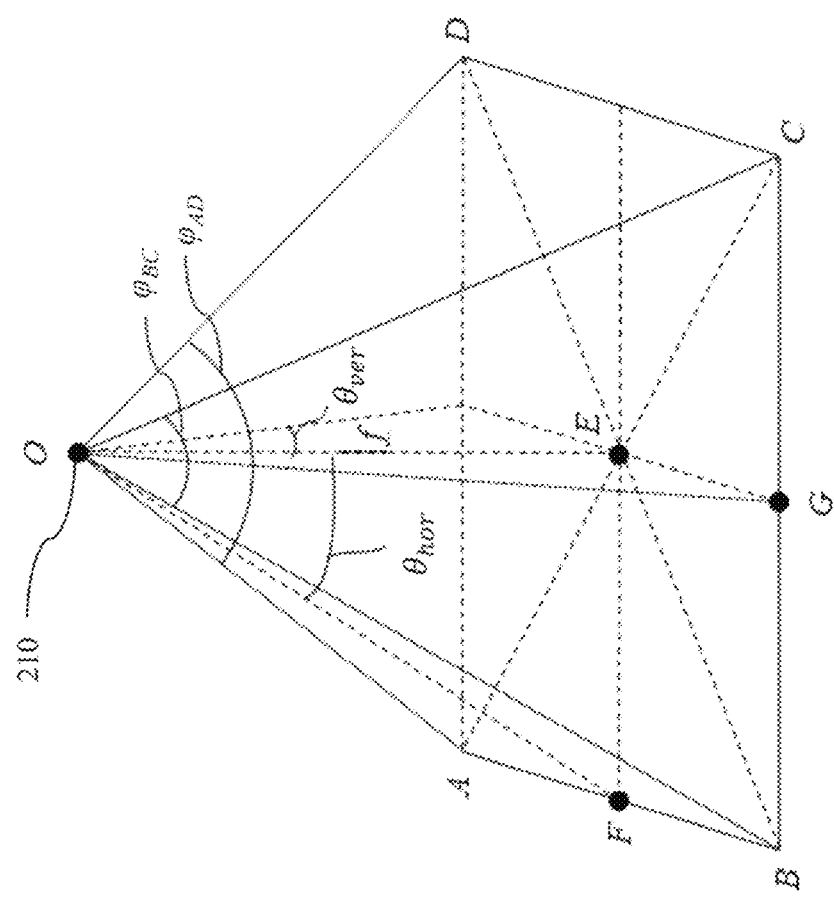
FIG. 26 is an exemplary diagram illustrating yet another embodiment of a method for assembling a panoramic image in accordance with the method of FIG. 6.

Turning now to FIG. 26, another alternative embodiment of a method for using one or more imaging devices 200 to obtain overlapping images is shown. O represents an optic center of a lens (not shown) of an imaging device 200. Let a sensor (not shown) associated with the lens be represented as ABCD, with measurements of W×H, wherein W represents a width of the sensor and H represents a height of the sensor. Thus, AD=BC=W and AB=DC=H. E, F and G represent midpoints of sides of the area ABCD. The imaging device 200 has a horizontal FOV angle $\theta_{hor}$ and a vertical FOV angle $\theta_{ver}$, and f represents a focal length of the lens of the imaging device 200. The FOV of the imaging device 200 has a first horizontal-direction (width direction) base line $\varphi_{AD}$ and a second horizontal-direction (width direction) base line $\varphi_{BC}$. According to a projection model of the imaging device 200, taking a rectilinear lens as an example, the following relationships can exist:

$$\begin{cases} f \tan\left(\frac{\theta_{hor}}{2}\right) = \frac{W}{2} \\ f \tan\left(\frac{\theta_{ver}}{2}\right) = \frac{H}{2} \end{cases} \quad \text{Equation (22)}$$

Coordinates of a point on an image can thereby be converted into three-dimensional coordinates according to the above, and by Equations (10)-(14).

Figure 27:
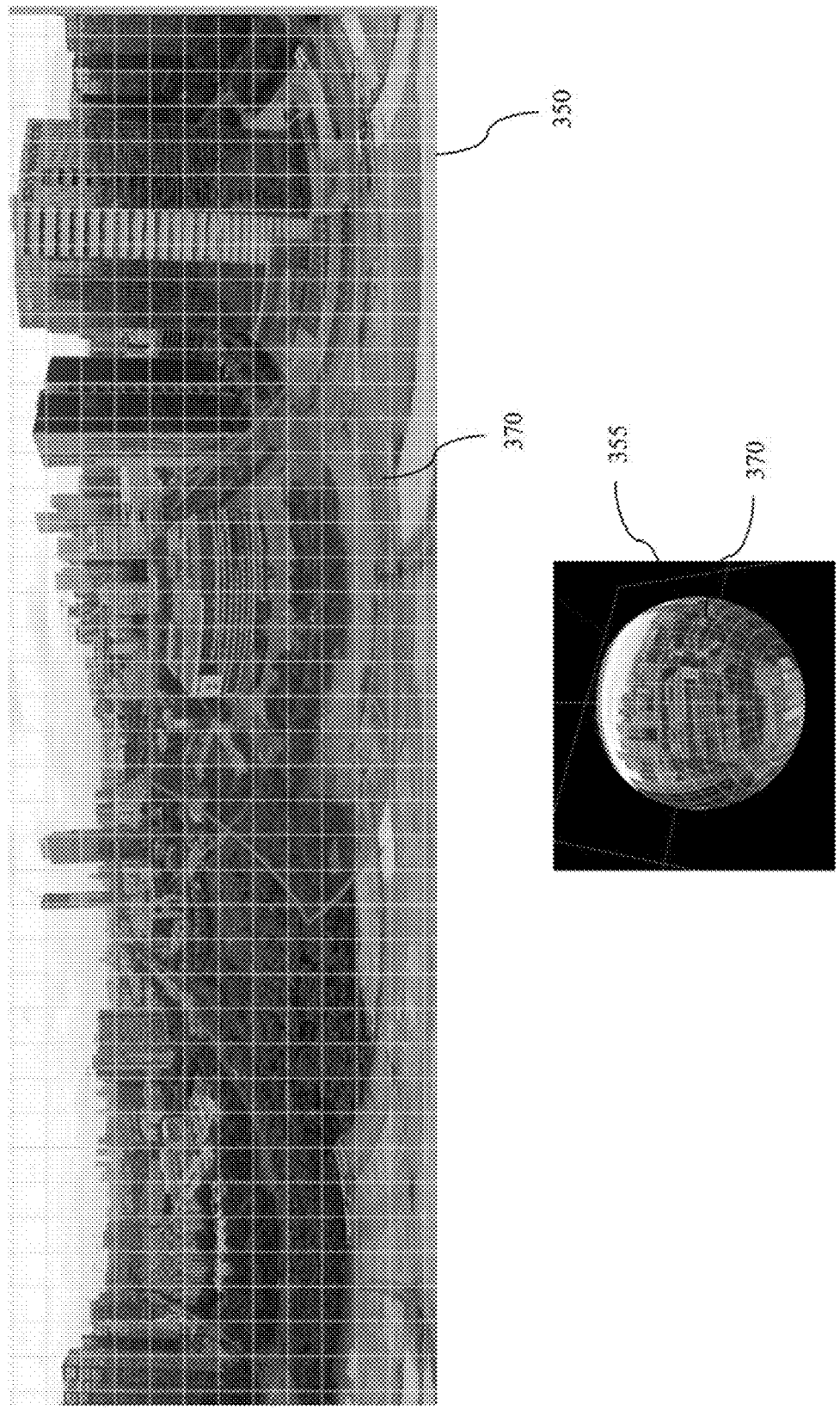
FIG. 27 is an exemplary diagram illustrating an embodiment of a method for selecting a viewport in accordance with the method of FIG. 6.

Turning now to FIG. 27, an exemplary selection of a viewport 370 is shown. In some embodiments, the viewport 370 can be selected by a user 20 (shown in FIG. 1) as a region of a stabilized image 320, a region of an equirectangular image 330, a region of a panoramic image 350, or any other image. In some embodiments, the viewport 370 can be selected by the user using an interface that presents the image to the user 20 and allows the user 20 to select the viewport 370. The viewport selection can occur, for example on a liveview terminal 450 for displaying the images and/or video to the user 20 in real time. For example, the liveview terminal 450 can be displayed within an application for mobile platform imaging and control. Alternatively, and/or additionally, the viewport 370 can be automatically selected by the application based on a viewing angle of the imaging device 200 (shown in FIG. 1)

The viewport 370 can be selected and/or displayed using different representations of the image. In some embodiments, the viewport 370 can be selected and/or displayed in rectilinear coordinates. In other embodiments, the viewport 370 can be selected and/or displayed in equirectangular coordinates on an equirectangular image 350, as shown in FIG. 27. In other embodiments, the viewport 370 can be selected and/or displayed in a globe view 355, as shown in FIG. 27.

In some embodiments of the systems and methods herein, a UAV 120 can use a gimbal 260 mounted thereto to mechanically compensate for a positional angle of the UAV 120. For example, the UAV 120 can experience shaking or jitter during flight (i.e., while moving or hovering), resulting in blurriness of images acquired by a mounted imaging device 200. In some embodiments, as described above with reference to FIGS. 3 and 4, one or more IMUs 220 can be mounted to the imaging device 200 to obtain Euler angles ($\alpha$, $\beta$, $\varphi$) of the imaging device 200 over time. The gimbal 260 can be configured to compensate for changes in the Euler angles ($\alpha$, $\beta$, $\varphi$) so as to maintain a steady field-of-view of the imaging device 200. For example, suppose that the IMUs 220 have detected that the Euler angle ($\alpha$, $\beta$, $\varphi$) of the imaging device 200 has changed by an amount of ($\Delta\alpha$, $\Delta\beta$, $\Delta\varphi$) between time t=0 and t=1. The UAV 120 can accordingly control the gimbal 260 to make an adjustment ($-\Delta\alpha$, $-\Delta\beta$, $-\Delta\varphi$), so that the imaging device 200 is restored to the previous imaging angle.

In another example of mechanical compensation, during flight (i.e., while moving or hovering), the UAV 120 can have a positional angle that is not parallel to the ground level under the UAV 120. As a result, images acquired by an imaging device 200 mounted to the UAV 120 can appear crooked or off-level to a user 20. To resolve this problem, the UAV 120 can advantageously adjust the gimbal 260 to restore the imaging device 200 to have a level view relative to the ground. Turning to FIG. 28, a specific example of mechanical compensation for the positional angle of the UAV 120 is illustrated. The UAV 120 is shown as having a positional angle $\beta$ degrees relative to a horizontal reference line 271a. Equivalently, the UAV 120 has a positional angle (90-$\beta$) degrees relative to a vertical reference line 271b that is perpendicular to the horizontal reference line 271a. An imaging device 200 is shown as being mounted to the UAV 120 using a gimbal 260, which can adjust a relative angle $\alpha$ of the imaging device 200 relative to the UAV 120. As shown, the relative angle $\alpha$ of the imaging device 200 has been adjusted so that a viewing line 235 of the imaging device 200 is parallel to the horizontal reference line 271a.

Turning now to FIG. 29, an exemplary method 2900 is shown for using a gimbal 260 to compensate for the positional angle $\beta$ of the UAV 120. At 2910, a horizontal or vertical reference line 271 of the UAV 120 can be determined. The horizontal or vertical reference line 271 can be determined according to an environment of the UAV 120. For example, the horizontal or vertical reference line 271 can be determined according to the level of the ground under the UAV 120 or a position of a horizon. In some embodiments, the horizontal or vertical reference line 271 can be determined according to input image 310 acquired by an imaging device 200 mounted to the UAV 120. Automatic feature recognition techniques (as discussed above with reference to FIG. 14) can be used to extract features (such as a horizon or ground) of the input image 310 that are indicative of the attitude of the UAV 200. The attitude of the UAV 200 can be determined based on the positions of such features, and the horizontal or vertical reference line 271 can be ascertained accordingly.

At 2920, one or more imaging devices 200 mounted to the UAV 120 can be adjusted to a level view using the horizontal or vertical reference line 271. For example, suppose that the positional angle β of the UAV 120 is offset from the horizontal reference line 271a by a pitch angle of θ. The UAV 120 can accordingly transmit a signal to the gimbal 260 to change the relative pitch angle α by −θ so as to compensate for the offset.

Turning now to FIG. 30, an exemplary processing system 3000 in accordance with the present systems and methods is shown as having an obtaining module 3010, an adjusting module 3020, and a displaying module 3030. The adjusting module can be configured to obtain movement data 225 for one or more imaging devices 200 mounted to a mobile platform 100. In some embodiments, the movement data 225 of the imaging devices 200 can be obtained using one or more IMUs 220. For example, as shown in FIG. 3, the movement data 225 can be obtained using a plurality of IMUs 220, wherein each of the plurality of IMUs 220 is mounted to one of the imaging devices 200 and configured to measure the position of the imaging device 200 to which the IMU 220 is mounted. Alternatively, and/or additionally, as shown in FIG. 4, movement data 225 of a reference point 202 on the mobile platform can be obtained using a single IMU 220. Movement data 225 for each of the imaging devices 200 can subsequently be interpolated based on a relative position between the imaging devices 200 and the reference point 202.

The adjusting module 3020 can be configured to adjust the input images 310 that are acquired by the imaging devices 200 according to the movement data 225 to obtain stabilized images 320. In some embodiments, the input images 310 can be adjusted by applying a rolling shutter image stabilization based on the movement data 225 for the respective imaging device 200. Alternatively, and/or additionally, the input images 310 can be adjusted by applying a projective transform image stabilization based on the movement data 225 for the respective imaging device 200. As further detailed below, in some embodiments, the stabilized images 320 can be assembled into a larger image such as a panoramic image 350 (shown in FIG. 7). For example, an equirectangular projection can be applied to each of the stabilized images 320 to obtain equirectangular images 330 (shown in FIG. 7). The equirectangular images 330 can be stitched together to obtain a stabilized panoramic image 350.

The displaying module 3030 can be configured to display the stabilized images 320 according to a selected viewport 370. For example, stabilized panoramic image 350 can be transmitted to a user terminal 400 and displayed according to the viewport 370. The viewport 370 can be selected by as user 20. For example, the viewport 370 can be selected by the user 20 in a liveview terminal 450. Upon selection of the viewport 370, a liveview video 390 (shown in FIG. 7) comprising stabilized images 320 can be displayed to the user 20 based on selection of the viewport 370.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method of image stabilization comprising:
    obtaining movement data for an imaging device mounted to a mobile platform;
    adjusting an input image acquired by the imaging device according to the movement data to obtain a stabilized image, including:
        applying a projective transform image stabilization to the input image based on the movement data, including:
            selecting a mesh of input points on the input image; and
            determining a plurality of output points each corresponding to one input point of the mesh of input points by applying a projective transform to the one input point based on a deviation of an Euler angle of the one input point from an objective Euler angle; and
    displaying the stabilized image according to a selected viewport.

2. The method of claim 1, wherein obtaining the movement data includes obtaining the movement data using an inertial measurement unit (IMU).

3. The method of claim 2, wherein the IMU is mounted to the imaging device and configured to measure a position of the imaging device.

4. The method of claim 2, wherein obtaining the movement data using the IMU includes:
    obtaining movement data of a reference point on the mobile platform using the IMU; and
    interpolating the movement data of the reference point based on a relative position between the imaging device and the reference point to obtain the movement data for the imaging device.

5. The method of claim 1, wherein adjusting the input image further includes applying a rolling shutter image stabilization to the input image based on the movement data for the imaging device.

6. The method of claim 5, wherein applying the rolling shutter image stabilization includes correcting a line of the input image according to the movement data for the imaging device at an acquisition time of the line.

7. The method of claim 5, wherein applying the rolling shutter image stabilization includes periodically correcting a plurality of lines of the input image according to an inertial measurement unit (IMU) frequency.

8. The method of claim 5, wherein applying the rolling shutter image stabilization includes correcting a line of the input image according to interpolated movement data for the imaging device at an acquisition time of the line, the interpolated movement data being obtained by interpolating the movement data for the imaging device based on movement data of a reference point on the mobile platform obtained using an inertial measurement unit (IMU) and a relative position between the imaging device and the reference point.

9. The method of claim 1, wherein applying the projective transform image stabilization further includes projecting the input image into the selected viewport according to the output points.

10. The method of claim 1, wherein applying the projective transform image stabilization further includes applying a lens correction transformation to each of the input points.

11. The method of claim 1, wherein the mobile platform is an unmanned aerial vehicle (UAV).

12. The method of claim 11, wherein the imaging device is mounted to the UAV using a gimbal.

13. The method of claim 12, wherein the UAV is configured to use the gimbal to mechanically compensate for a positional angle of the UAV.

14. The method of claim 13, wherein the UAV is configured to compensate for the positional angle of the UAV by:
   determining a horizontal or vertical reference line of the UAV; and
   adjusting the imaging device to a level view using the horizontal or vertical reference line.

15. A method of image stabilization comprising:
   obtaining movement data for an imaging device mounted to a mobile platform;
   adjusting an input image acquired by the imaging device according to the movement data to obtain a stabilized image, including:
      applying a projective transform image stabilization to the input image based on the movement data, including:
         selecting a mesh of output points on an output image; and
         determining an input point corresponding to one output point of the mesh of output points by iteratively applying a reverse projective transform to the one output point based on a deviation of an Euler angle of the input point from an objective Euler angle; and
      displaying the stabilized image according to a selected viewport.

16. The method of claim 15, wherein determining the input point includes:
   (a) initializing coordinates of the input point according to coordinates of the one output point;
   (b) applying the reverse projective transform according to an Euler angle of prior coordinates of the input point to obtain updated coordinates of the input point;
   (c) obtaining an Euler angle of the updated coordinates of the input point;
   (d) determining whether the Euler angle of the updated coordinates is sufficiently close to the Euler angle of the prior coordinates; and
   repeating (a)-(d) until the Euler angle of the updated coordinates is sufficiently close to the Euler angle of the prior coordinates.

17. The method of claim 15, wherein applying the projective transform image stabilization further includes applying a reverse lens correction transformation to each of the output points.

* * * * *